(12) United States Patent
McFarland

(10) Patent No.: US 10,611,424 B2
(45) Date of Patent: Apr. 7, 2020

(54) CONVERSION BICYCLE APPARATUS

(71) Applicant: Strider Sports International, Inc., Rapid City, SD (US)

(72) Inventor: Ryan McFarland, Rapid City, SD (US)

(73) Assignee: Strider Sports International, Inc., Rapid City, SD (US)

( * ) Notice: Subject to any disclaimer, the term of this patent is extended or adjusted under 35 U.S.C. 154(b) by 162 days.

(21) Appl. No.: 15/605,694

(22) Filed: May 25, 2017

(65) Prior Publication Data
US 2018/0339744 A1    Nov. 29, 2018

(51) Int. Cl.
| | |
|---|---|
| *B62K 13/08* | (2006.01) |
| *B62J 25/00* | (2020.01) |
| *B62K 3/02* | (2006.01) |
| *B62J 13/04* | (2006.01) |
| *B62M 1/38* | (2013.01) |
| *B62M 9/02* | (2006.01) |
| *B62M 11/02* | (2006.01) |
| *B62K 25/02* | (2006.01) |
| *B62K 9/00* | (2006.01) |

(52) U.S. Cl.
CPC ............ *B62K 13/08* (2013.01); *B62J 13/04* (2013.01); *B62J 25/00* (2013.01); *B62K 3/02* (2013.01); *B62K 9/00* (2013.01); *B62K 25/02* (2013.01); *B62M 1/38* (2013.01); *B62M 9/02* (2013.01); *B62M 11/02* (2013.01)

(58) Field of Classification Search
CPC .. B62K 12/08; B62K 3/02; B62K 9/00; B62J 25/00; B62M 1/36
See application file for complete search history.

(56) References Cited

U.S. PATENT DOCUMENTS

| | | |
|---|---|---|
| 640,756 A | 1/1900 | Douglas |
| 3,945,667 A | 3/1976 | Cipres |
| 7,798,513 B1 | 9/2010 | Salvant |
| D629,049 S | 12/2010 | McFarland |
| 2004/0070165 A1 | 4/2004 | Liebetrau et al. |
| 2004/0201199 A1 | 10/2004 | Liebetrau et al. |
| 2008/0315553 A1 | 12/2008 | Girout et al. |
| 2012/0000735 A1 | 1/2012 | Iwai et al. |

(Continued)

OTHER PUBLICATIONS

Griffiths, "The bike that GROWS with your child: £155 bicycle expands to save parents cash", <http://www.dailymail.co.uk/sciencetech/article-2834524/The-bike-GROWS-child-155-bicycle-expands-save-parents-cash.html>, Nov. 14, 2014.

(Continued)

*Primary Examiner* — Tony H Winner
(74) *Attorney, Agent, or Firm* — Suiter Swantz pc llo

(57) ABSTRACT

A conversion bicycle apparatus includes a chassis. The chassis includes a main tube. The chassis additionally includes a head tube. The chassis additionally includes a seat tube. The chassis additionally includes a rear fork. The rear fork includes a first fork arm and a second fork arm. The chassis additionally includes an attachment receiver. The attachment receiver is located proximate to a junction of at least the main tube and the rear fork. An attachment assembly is reversibly couplable to the attachment receiver via one or more protrusions and one or more corresponding apertures. The attachment assembly is additionally reversibly couplable to the attachment receiver via one or more fasteners.

31 Claims, 32 Drawing Sheets

(56) References Cited

U.S. PATENT DOCUMENTS

2014/0210318 A1* 7/2014 Yao .................. H02K 7/14
  310/67 R
2016/0001843 A1  1/2016 Evans
2016/0075400 A1  3/2016 Ragland et al.
2016/0375949 A1  12/2016 Mondello

OTHER PUBLICATIONS wisegrowth.com, "Smarttrail 16 Convertible Balance Bike", <http://www.wise-growth.com/products/smarttrail-16-convertible-balance-bike/> 2017.

amazon.com, "Vilano 2 in 1 Balance Bike Kids Pedal Bicycle", <https://www.amazon.com/dp/B0127F9GY6>.

amazon.com, "Rennrad Convertible 2 in 1 Balance/Pedal Bike", <https://www.amazon.com/Rennrad-Convertible-Balance-Pedal-Bike/dp/B00X64QMU4/ref=sr_1_1?ie=UTF8&qid=1485883227&sr=8-1&keywords=rennrad+convertible+2+in+1+balance+pedal+bike>.

* cited by examiner

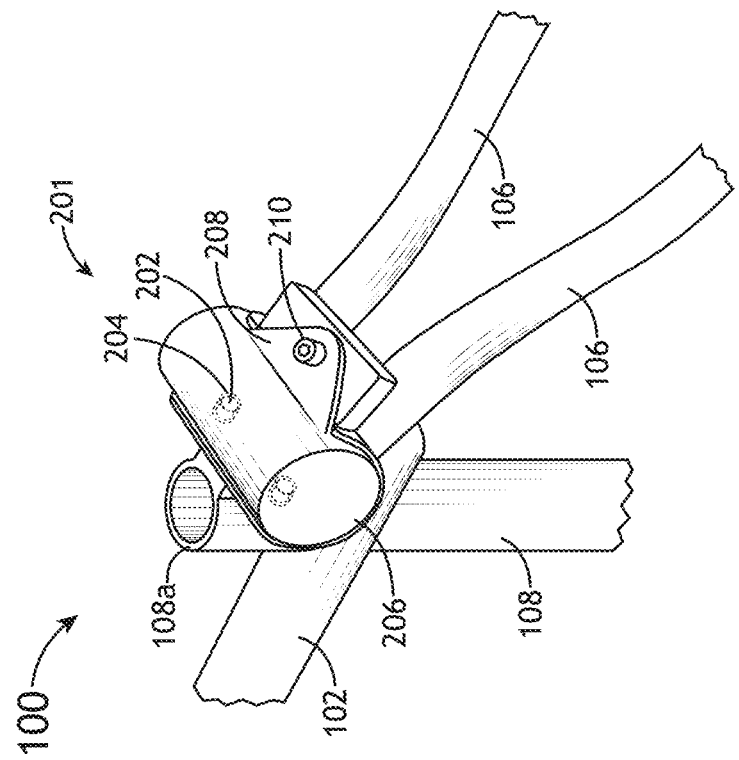
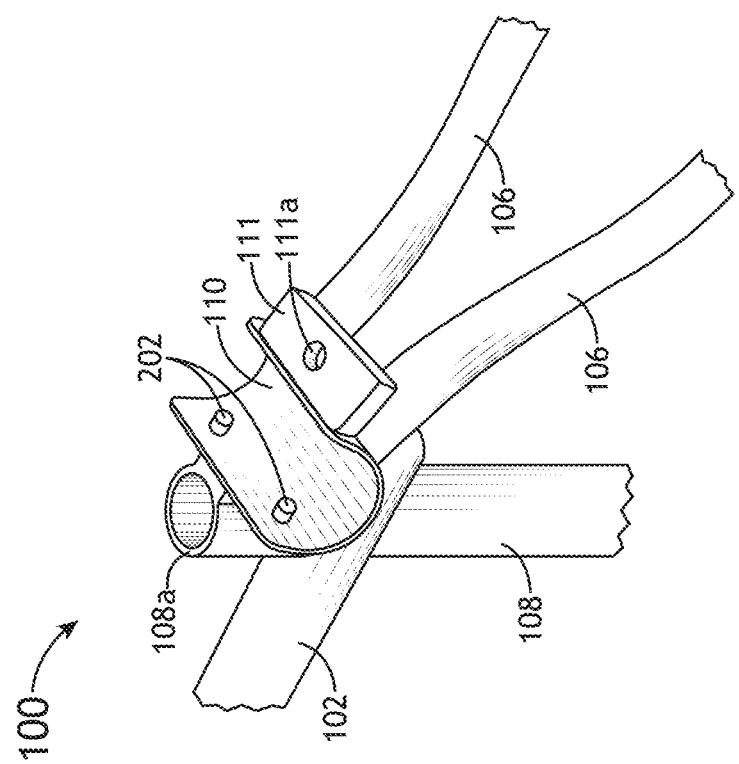
FIG.2A
FIG.2B

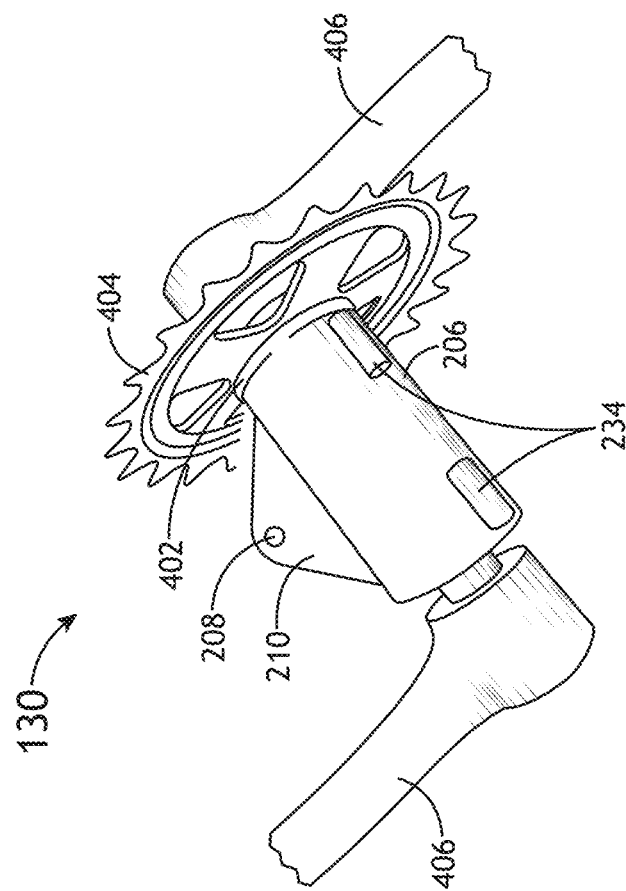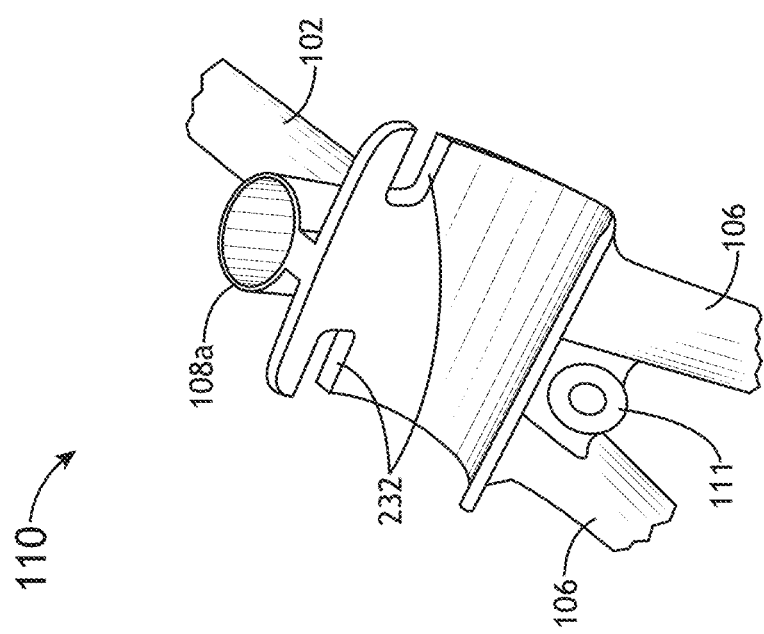

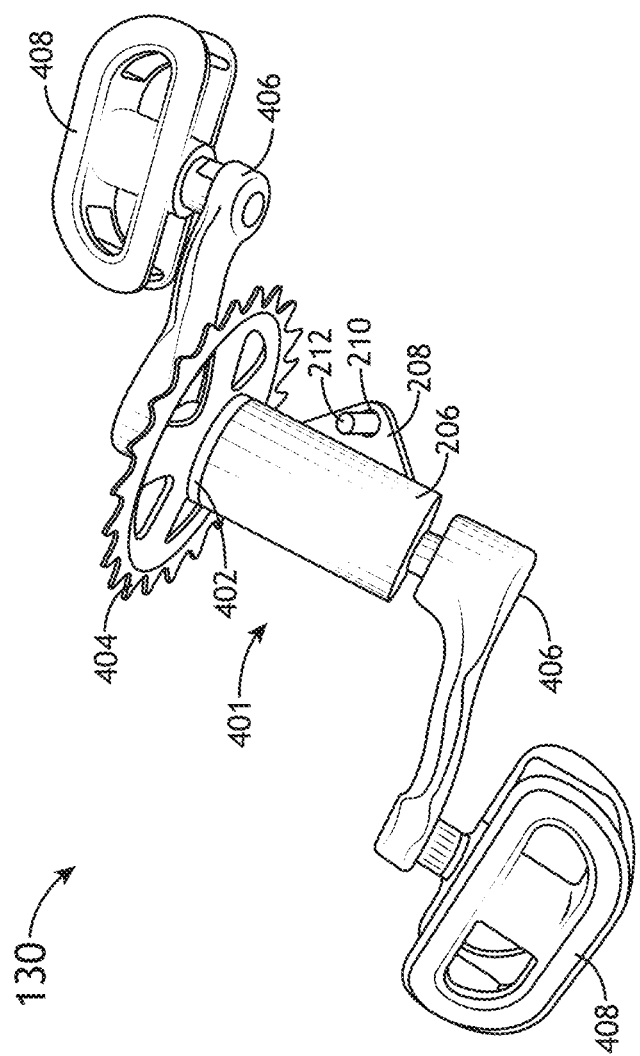

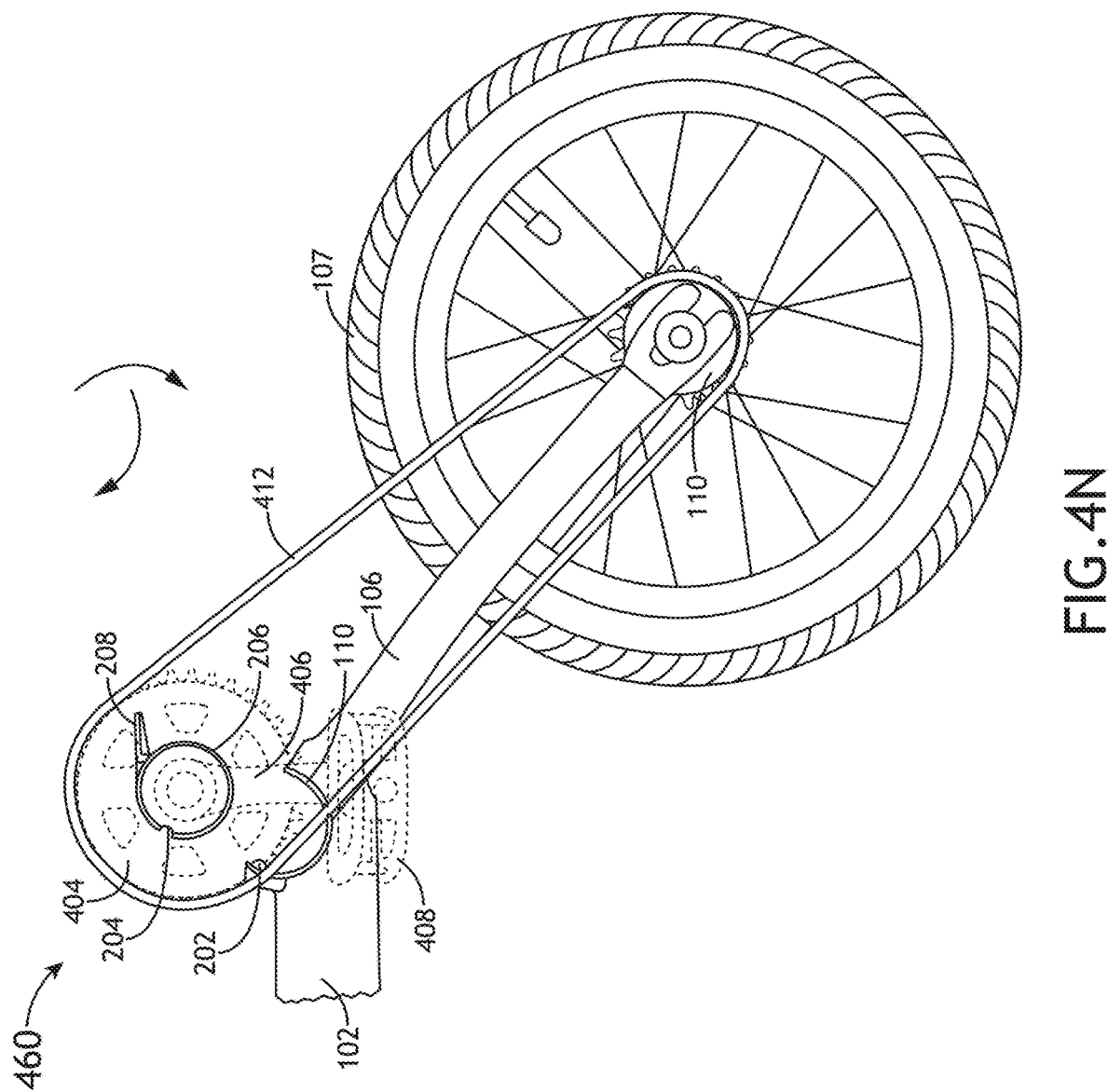

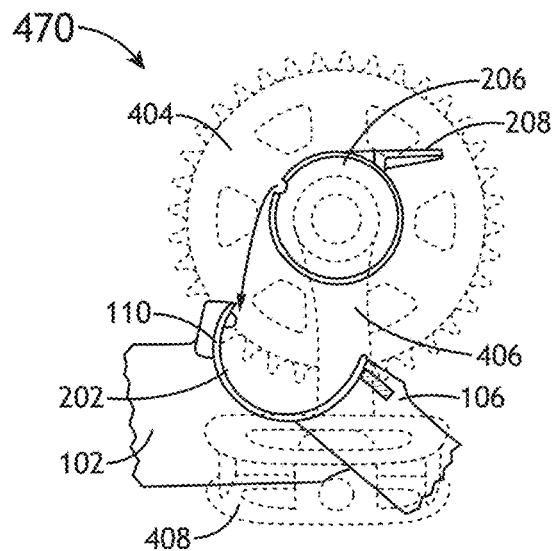

CONVERSION BICYCLE APPARATUS

TECHNICAL FIELD

The present invention generally relates to a conversion bicycle apparatus and, more particularly, to a conversion bicycle apparatus that converts between one or more bicycle modes by the attachment or replacement of one or more attachment assemblies to the conversion bicycle apparatus.

BACKGROUND

The process of learning how to ride a bicycle includes learning how to steer the bicycle, pedal the bicycle, and self-balance on the bicycle. Traditionally, a user first learns how to steer and pedal the bicycle with the assistance of training wheels or another person who holds the bicycle upright, before learning how to self-balance on the bicycle. While initially helpful in learning how to pedal, the assistance of training wheels or another person who holds the bicycle upright generally proves detrimental to the user's ability to steer the bicycle, and the user has to un-incorporate those assistance tools with the steering process.

Additionally, when the user has to incorporate self-balancing the bicycle with the newly-learned skills of pedaling and steering, additional obstacles present themselves. Limitations in the bicycle construction such as seat height may result in a lack of comfort when trying to self-balance, the lack of comfort caused in part by a combination of not being able to simultaneously sit on the bicycle and reach the ground, and a lack of balance that generally exists prior to reaching a certain age. Additionally, limitations in the bicycle construction such as pedal crank length may result in dead spots throughout the pedal stroke. Further, limitations in the bicycle construction such as pedal width may prevent the child from interacting with the ground around the pedals. These additional obstacles often result in initial (and sometimes continued failure for the user), increasing the frustration of the user during the learning process and the time it takes to complete the learning process, while potentially injuring the user.

As such, it would be desirable to provide a system and method that cures the shortcomings of the previous approaches as identified above. For example, it would be desirable to provide a system and method that reduces the amount of time it takes to learn to ride a bicycle.

SUMMARY

A conversion bicycle apparatus is disclosed, in accordance with one or more embodiments of the present disclosure. In one embodiment, the conversion bicycle apparatus includes a chassis. In another embodiment, the chassis includes a main tube. In another embodiment, the chassis includes a head tube. In another embodiment, the chassis includes a seat tube. In another embodiment, the chassis includes a rear fork. In another embodiment, the rear fork includes a first fork arm and a second fork arm. In another embodiment, the chassis includes an attachment receiver. In another embodiment, the attachment receiver is located proximate to a junction of at least the main tube and the rear fork. In another embodiment, an attachment assembly is reversibly couplable to the attachment receiver via one or more protrusions and one or more corresponding apertures. In another embodiment, the attachment assembly is reversibly couplable to the chassis via one or more fasteners.

An apparatus is disclosed, in accordance with one or more embodiments of the present disclosure. In one embodiment, the apparatus includes an attachment receiver of a chassis of a vehicle. In another embodiment, the attachment receiver is located proximate to a junction of at least two additional components of the chassis. In another embodiment, an attachment assembly is reversibly couplable to the attachment receiver via one or more protrusions and one or more corresponding apertures. In another embodiment, the attachment assembly is reversibly couplable to the chassis via one or more fasteners.

A method is disclosed, in accordance with one or more embodiments of the present disclosure. In one embodiment, the method includes reversibly coupling an attachment assembly to an attachment receiver of a chassis of a vehicle via one or more protrusions and one or more corresponding apertures. In another embodiment, the method includes reversibly rotating the attachment assembly in the attachment receiver to align a bracket mount plate aperture of a bracket mount plate of the attachment assembly with a chassis plate aperture of a chassis plate. In another embodiment, the method includes reversibly coupling the attachment assembly to the chassis plate via the aligned bracket mount plate aperture and chassis plate aperture with one or more fasteners.

In another embodiment, the method includes reversibly coupling the attachment assembly to a rear transmission component on a rear wheel of the vehicle via a power transmission component without uncoupling the power transmission component from a main transmission component on the attachment assembly, prior to reversibly coupling the attachment assembly to the attachment receiver of the chassis of the vehicle via the one or more protrusions and the one or more corresponding apertures.

An adaptable bicycle operable by a user via a set of configurations is disclosed, in accordance with one or more embodiments of the present disclosure. In one embodiment, the adaptable bicycle is operable by a user via a first configuration, where the user straddles a chassis of the adaptable bicycle, where the user propels the chassis via contact with the ground. In another embodiment, the adaptable bicycle is operable by a user via a second configuration, where the user sits on a seat of the adaptable bicycle, where the user propels the chassis via contact with the ground. In another embodiment, the adaptable bicycle is operable by a user via a third configuration, where the user sits on the seat of the adaptable bicycle, where the user alternates between propelling the chassis via contact with the ground and resting their feet on a rear fork of the chassis while at least one of coasting or gliding. In another embodiment, the adaptable bicycle is operable by a user via a fourth configuration, where the user alternates between sitting on the seat of the adaptable bicycle and propelling the chassis via contact with the ground, and standing on the rear fork of the adaptable bicycle and propelling the chassis forward by shifting their weight to maintain a momentum generated by propelling the chassis via contact with the ground. In another embodiment, the adaptable bicycle is operable by a user via a fifth configuration, where the user sits on the seat of the adaptable bicycle, where the user alternates between propelling the chassis via contact with the ground and resting their feet on an attachment assembly reversibly couplable to an attachment receiver of the chassis while at least one of coasting or gliding. In another embodiment, the adaptable bicycle is operable by a user via a sixth configuration, where the user sits on the seat of the adaptable bicycle, where the user alternates between propelling the chassis via contact with the ground and propelling the chassis via actuation of the attachment assembly.

A conversion bicycle apparatus is disclosed, in accordance with one or more embodiments of the present disclosure. In one embodiment, the conversion bicycle apparatus includes a chassis. In another embodiment, the conversion bicycle apparatus includes a seat assembly configured to enter an upper opening of the chassis and exit through a lower opening of the chassis. In another embodiment, the conversion bicycle apparatus includes a footrest assembly comprising a first footrest and a second footrest. In another embodiment, the conversion bicycle apparatus includes a pedal assembly. In another embodiment, the pedal assembly includes a first pedal coupled to a first pedal crank. In another embodiment, the pedal assembly includes a second pedal coupled to the second pedal crank. In another embodiment, the seat assembly is set at a selected height to allow for a user to propel the chassis forward via contact with the ground while sitting on the seat assembly. In another embodiment, the first pedal crank and the second pedal crank are a selected length to allow for the user to propel the chassis forward via contact with the ground while sitting on the seat assembly. In another embodiment, the first footrest and the second footrest are a selected width to allow for the user to propel the chassis forward via contact with the ground while at least one of sitting on the seat assembly or straddling the chassis without making contact with the first footrest and the second footrest. In another embodiment, the first pedal and the second pedal are a selected width to allow for the user to propel the chassis forward via contact with the ground while at least one of sitting on the seat assembly or straddling the chassis without making contact with the first pedal and the second pedal. In another embodiment, the chassis is configured to have a selected lean angle clearance based on at least one of the selected height of the seat assembly, the selected length of the first pedal crank and the second pedal crank, the selected width of the first footrest and the second footrest, and the selected width of the first pedal and the second pedal.

A guard for a bicycle is disclosed, in accordance with one or more embodiments of the present disclosure. In one embodiment, the guard includes a forward ring. In another embodiment, the forward ring includes one or more mount plates. In another embodiment, the one or more mount plates are reversibly couplable to a crankset coupled to a chassis of the bicycle. In another embodiment, the forward ring includes one or more mount plate apertures within the one or more mount plates. In another embodiment, the one or more mount plate apertures are reversibly couplable to a portion of the chassis of the bicycle with one or more fasteners. In another embodiment, the forward ring includes one or more protrusions. In another embodiment, the chain guard includes a rear cover. In another embodiment, the rear cover includes a raised portion. In another embodiment, the raised portion includes one or more apertures corresponding to the one or more protrusions. In another embodiment, the rear cover is reversibly couplable to the forward ring via the one or more protrusions and the corresponding one or more apertures. In another embodiment, the rear cover includes one or more access apertures. In another embodiment, the one or more access apertures accommodate one or more components of the bicycle.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 2A illustrates an attachment receiver, in accordance with one or more embodiments of the present disclosure.

FIG. 2B illustrates a bracket of an attachment assembly, in accordance with one or more embodiments of the present disclosure.

FIG. 2E illustrates an attachment receiver, in accordance with one or more embodiments of the present disclosure.

FIG. 2F illustrates an attachment assembly, in accordance with one or more embodiments of the present disclosure.

FIG. 4A illustrates a pedal assembly, in accordance with one or more embodiments of the present disclosure.

FIG. 4N illustrates a side view of the coupling of a pedal assembly, in accordance with one or more embodiments of the present disclosure.

FIG. 4O illustrates a side view of the coupling of a pedal assembly, in accordance with one or more embodiments of the present disclosure.

FIG. 4P illustrates a side view of the coupling of a footrest assembly, in accordance with one or more embodiments of the present disclosure.

FIG. 4Q illustrates a side view of the coupling of a pedal assembly, in accordance with one or more embodiments of the present disclosure.

DETAILED DESCRIPTION OF THE INVENTION

Reference will now be made in detail to the subject matter disclosed, which is illustrated in the accompanying drawings.

Referring generally to FIGS. 1A-6, a conversion bicycle 100 is described, in accordance with one or more embodiments of the present disclosure. For purposes of the present disclosure, the term "conversion bicycle" is used interchangeably with the terms "bicycle", "bicycle apparatus", or "balance bicycle".

Embodiments of the present disclosure are directed to a conversion bicycle. Embodiments of the present disclosure are also directed to multiple types of attachment assemblies that are reversibly couplable to an attachment receiver of the conversion bicycle. Embodiments of the present disclosure are also directed to converting between one or more bicycle modes of the conversion bicycle via the attachment of a particular attachment assembly to the conversion bicycle or the replacement of a particular attachment assembly with another type of attachment assembly.

For purposes of the present disclosure, a "user" may refer to a child rider, a teenage rider, an adult rider, a rider who has never learned how to ride a bicycle (either a child or an adult), a rider with special needs (either a child or an adult), or a rider of advanced age.

Figure 1A:
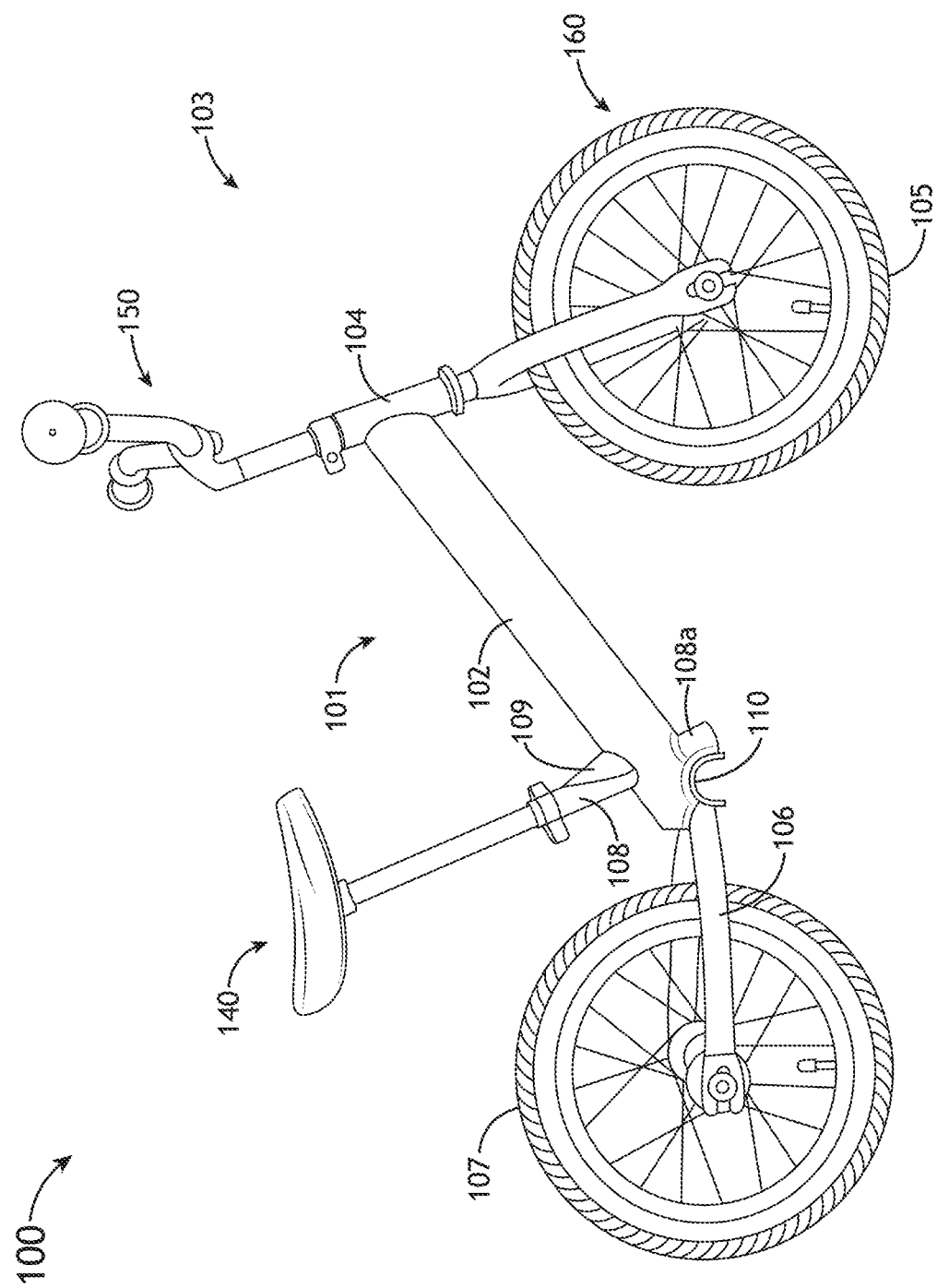
FIG. 1A illustrates a conversion bicycle apparatus, in accordance with one or more embodiments of the present disclosure.
Figure 1B:
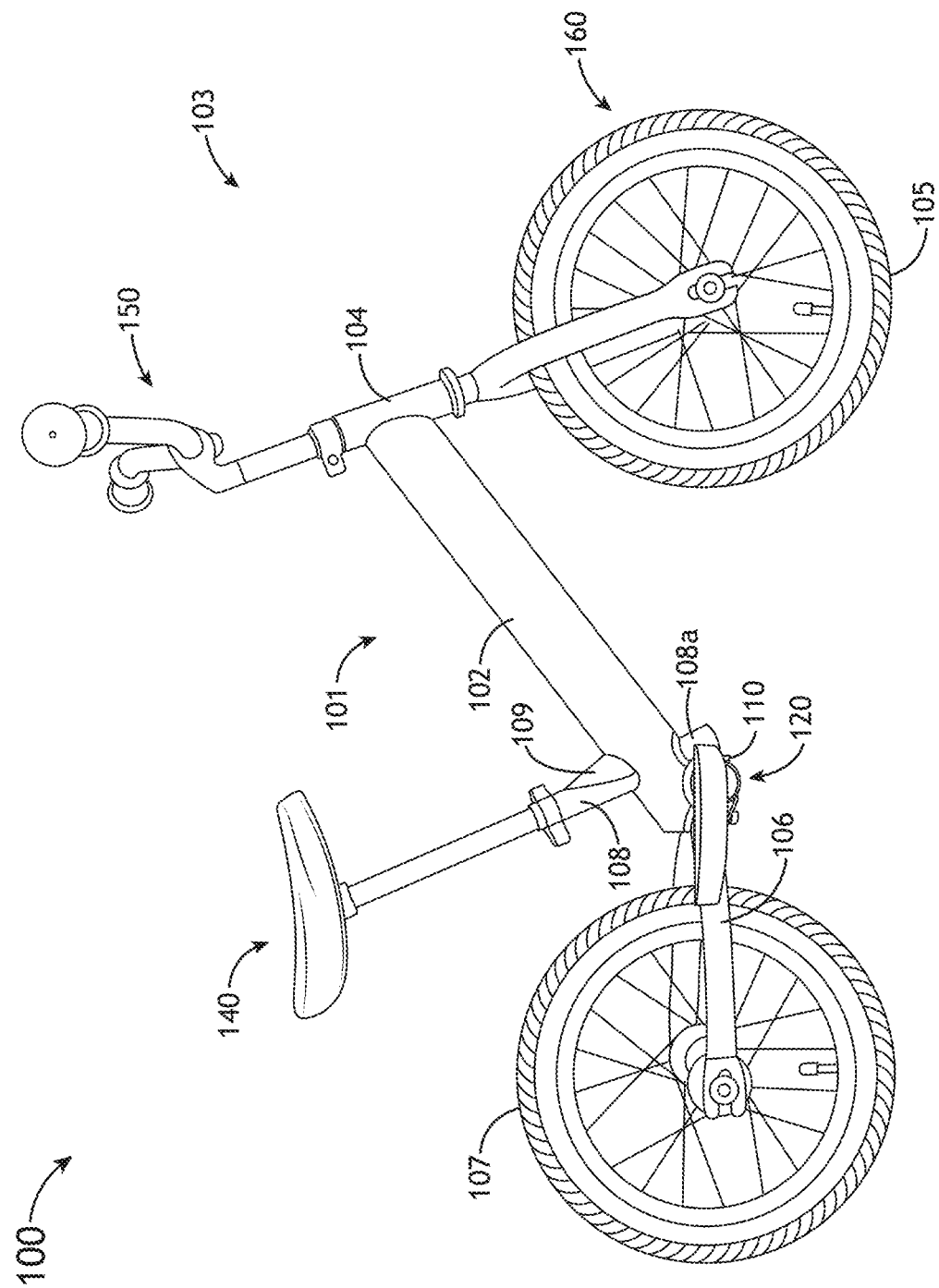
FIG. 1B illustrates a conversion bicycle apparatus configured with a footrest assembly, in accordance with one or more embodiments of the present disclosure.
Figure 1C:
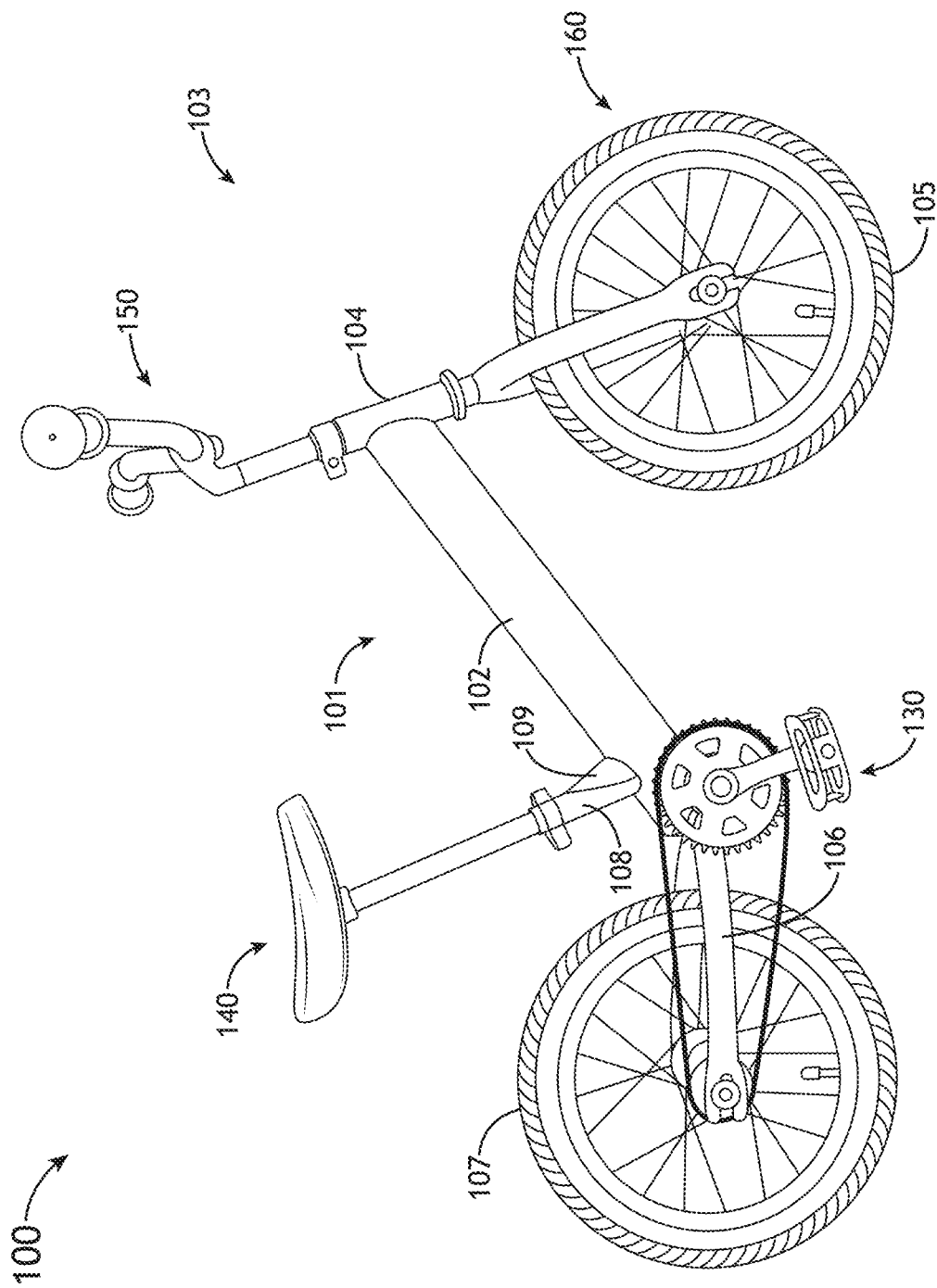
FIG. 1C illustrates a conversion bicycle apparatus configured with a pedal assembly, in accordance with one or more embodiments of the present disclosure.

FIGS. 1A-1C illustrate the conversion bicycle 100, in accordance with one or more embodiments of the present disclosure.

In one embodiment, the conversion bicycle 100 includes a chassis 101. In another embodiment, the chassis 101 includes a main tube 102. In another embodiment, the main tube 102 is offset a selected angle from the horizontal plane (e.g. the ground). In another embodiment, the main tube 102 is substantially parallel to a horizontal plane. In another embodiment, the main tube 102 is a set of at least two main tubes. For example, the set of at least two main tubes may include at least a top tube and a bottom tube. For instance, the top tube and the bottom tube may be offset at the same angle from the horizontal plane (e.g. the top tube and the bottom tube are parallel). Alternatively, the top tube and the bottom tube may be offset at different angles from the horizontal plane. By way of another example, the set of at least two main tubes may include at least two tubes side-by-side.

In another embodiment, the chassis 101 includes a head tube 104. In another embodiment, the head tube 104 is offset a selected angle from the vertical plane. In another embodiment, the head tube 104 is substantially parallel to a vertical plane. It is noted herein that where the main tube 102 is a set of at least two main tubes, the at least two main tubes may be joined together such that only one of the at least two main tubes is coupled to the head tube 104. It is further noted herein that where the main tube 102 is a set of at least two main tubes, at least some of the at least two main tubes may couple to the head tube 104 at the same location. It is further noted herein that where the main tube 102 is a set of at least two main tubes, at least some of the at least two main tubes may couple to the head tube 104 at different locations.

In another embodiment, a steering assembly 103 is coupled to the head tube 104. In another embodiment, the steering assembly 103 includes a handlebar assembly 150 and a front fork assembly 160. In another embodiment, a front wheel 105 is coupled to the front fork assembly 160. The handlebar assembly 150 and the front fork assembly 160 are each described in detail further herein.

In another embodiment, the chassis 101 includes at least one wheel. For example, the chassis 101 may include a front wheel 105. By way of another example, the chassis 101 may include the rear wheel 107. It is noted herein the front wheel 105 and the rear wheel 107 may include one or more components including, but not limited to, a tire, a rim, a hub, or one or more spokes. It is further noted herein the front wheel 105 and the rear wheel 107 may each include a threaded rod through a bearing assembly. For example, a set of flat washers, lock washers, safety washers (with corresponding apertures in the rear fork or the front fork assembly 160) or any other type of spacer hardware known in the art may be coupled to the threaded rod. By way of another example, a set of hex nuts, acorn nuts, lock nuts or any other threaded hardware may be coupled to the threaded rod. It is further noted herein that any other type of fastener known in the art may be incorporated to fasten the front wheel 105 and the rear wheel 107 to the chassis 101.

In another embodiment, the chassis 101 includes a rear fork 106. In another embodiment, the rear fork 106 includes a first rear fork arm and a second rear fork arm. In another embodiment, the rear fork 106 is offset a selected angle from the horizontal plane. In another embodiment, the rear fork 106 is substantially parallel to a horizontal plane.

In another embodiment, the rear wheel 107 is coupled to the rear fork 106 via a dropout. For example, the first rear fork arm and the second rear fork arm may include the dropout cut in a flattened portion of the first rear fork arm and the second rear fork arm. By way of another example, the dropout may be formed by affixing one or more tabs to the first rear fork arm and the second rear fork arm.

In another embodiment, the chassis 101 includes a seat tube 108. In another embodiment, the seat tube 108 is offset a selected angle from the vertical plane. In another embodiment, the seat tube 108 is substantially parallel to the vertical plane.

In another embodiment, the seat tube 108 passes through the main tube 102. For example, the seat tube 108 may have a section 108a extruding from the underside of the main tube 102. In another embodiment, the seat tube 108 is coupled to the main tube 102 such that there is no section 108a extruding from the underside of the main tube 102.

In another embodiment, the seat tube 108 and the main tube 102 are coupled together via a set plate 109. For example, the set plate 109 provides additional support to the seat tube 108. It is noted herein, however, that the conversion bicycle 100 may not include the set plate, and the seat tube 108 and the main tube 102 may be coupled together only at a junction where the seat tube 108 passes through the main tube 102.

In another embodiment, a seat assembly 140 is set within the seat tube 108. The seat assembly 140 is described in detail further herein.

In another embodiment (not shown), the chassis 101 includes one or more seat stays coupled between the seat tube 108 and the rear fork 106. In another embodiment, the seat stays include one or more mount points. For example, the mount points may be configured for at least a rear brake assembly. By way of another example, the mount points may be configured for at least a fender assembly. It is noted herein the one or more seat stays including one or more mount points may be formed so as to allow for removal of the rear wheel without breaking or uncoupling a power transmission component (e.g. a chain, a toothed belt, or an elastic band), described in detail further herein.

In another embodiment, the chassis 101 includes an attachment receiver 110. In another embodiment, the attachment receiver 110 is located proximate to a junction of at least the main tube 102 and the rear fork 106. In another embodiment, the attachment receiver 110 is located proximate to a junction of at least the main tube 102 and the seat tube 108. In another embodiment, the attachment receiver 110 is located proximate to a junction of at least the main tube 102, the rear fork 106, and the seat tube 108. It is noted herein that the term proximate may refer to touching any of the chassis junctions as defined above. It is noted herein that the term proximate may refer to being behind, in front of, above, or below any of the chassis junctions as defined above at a selected distance. For example, the selected distance may range from, but is not limited to, 0 inches to 18 inches.

In another embodiment, the attachment receiver 110 is coupled to the main tube 102. For example, the receiver 110 may be coupled to the main tube 102 behind the section 108a of the seat tube 108. By way of another example, the receiver 110 may be coupled to the main tube 102 in front of the section 108a of the seat tube 108. By way of another example, the receiver 110 is coupled to the main tube 102 underneath the seat tube 108, such that there is no section 108a of the seat tube 108 extruding from the underside of the main tube 102.

By way of another example, the receiver 110 is coupled to the main tube 102 in front of the rear fork 106. By way of another example, the receiver 110 is coupled to the main tube 102 underneath the rear fork 106 (e.g. the rear fork 106 is coupled to the top of the main tube 102).

In another embodiment, an attachment assembly is configured to reversibly couple to the receiver 110. For example, the attachment assembly may include a footrest assembly 120, a pedal assembly 130, and/or a motor assembly, each of which are described in detail further herein.

In one embodiment, a user first uses the conversion bicycle 100 without an attachment assembly coupled to the attachment receiver 110, and instead sits on the seat (and/or stands, straddling the main tube 102) while propelling themselves with their feet via contact with the ground in a striding motion. In this regard, the user is not hindered by any components of the attachment assembly, and can focus on keeping the conversion bicycle 100 centered underneath.

In another embodiment, the user alternates between resting their feet on the rear fork 106 while at least one of coasting or gliding, and propelling themselves with their feet against the ground.

In another embodiment, the user may alternate between propelling themselves with the feet against the ground, and propelling themselves while standing on the rear fork 106 and shifting their weight at least one of forward, backward, up and/or down to adjust their momentum. In this regard, the user can propel themselves by standing on the rear fork 106 and shifting their weight to adjust their momentum after a minimum momentum is achieved by propelling themselves via contact with the ground.

To prevent the feet of the user from slipping while the user is resting or standing on the rear fork 106, the rear fork 106 may include a rough-surfaced sticker or a rough-surface spray coating for increased grip to prevent the feet of the user from slipping off the rear fork 106. In this regard, the user can practice self-balancing on the conversion bicycle 100 without having to worry about pedaling, instead propelling themselves via contact with the ground while coasting with their feet on the rear fork 106.

In another embodiment, the footrest assembly 120 is reversibly coupled to the attachment receiver 110 as the confidence of the user increases. In another embodiment, the user alternates between at least one of coasting or gliding on the conversion bicycle 100 with their feet on the footrest assembly 120 and propelling themselves with their feet via contact with the ground. In this regard, the user can practice self-balancing on the conversion bicycle 100 without having to worry about pedaling, instead propelling themselves via contact with the ground while coasting with their feet on the footrest assembly 120.

In another embodiment, the footrest assembly 120 is replaced with the pedal assembly 130 as the confidence of the user continues to increase. In another embodiment, the user alternates between at least one of coasting or gliding on the conversion bicycle 100 with their feet on the pedal assembly 130 and propelling themselves with their feet via contact with the ground. In this regard, the user can practice self-balancing on the conversion bicycle 100 without having to worry about pedaling, instead propelling themselves via contact with the ground while coasting with their feet on the footrest assembly 120.

In another embodiment, the user alternates between pedaling the pedal assembly 130 and propelling themselves with their feet via contact with the ground. In this regard, the user can practice pedaling, steering, and self-balancing the conversion bicycle at the same time, while still making contact with the ground when necessary.

FIGS. 2A-2H illustrate the attachment receiver 110 and a bracket assembly 201 of the attachment assembly, in accordance with one or more embodiments of the present disclosure.

In one embodiment, the attachment assembly includes a bracket assembly 201. In another embodiment, the attachment assembly includes at least one conversion component. For example, the at least one conversion component may include any of one or more footrests, a crankset, or a motor, each of which are described in detail further herein.

In another embodiment, as illustrated in FIGS. 2A and 2B, the bracket assembly 201 includes a bracket 206. For example, the bracket 206 may be a round tube. By way of another example, the bracket 206 may be a square tube. By way of another example, the bracket 206 may be a tube of any shape known in the art. By way of another example, the bracket 206 may be a plate that conforms to at least a part of the attachment receiver 110. In another embodiment, the bracket assembly 201 includes a bracket mount plate 208 coupled to the bracket 206. In another embodiment, the bracket mount plate 208 includes one or more bracket mount plate apertures 210.

Figure 2D:
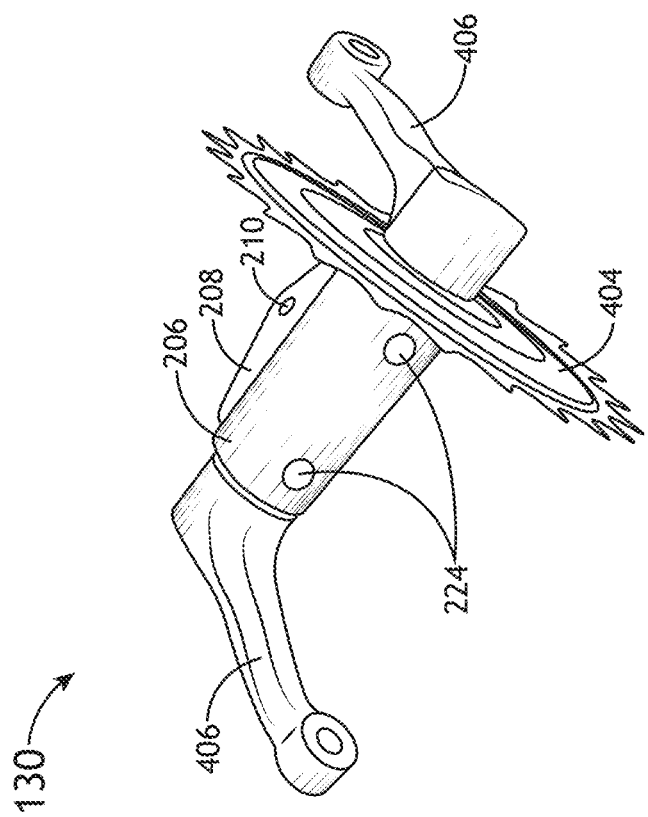
FIG. 2D illustrates an attachment assembly, in accordance with one or more embodiments of the present disclosure.
Figure 2C:
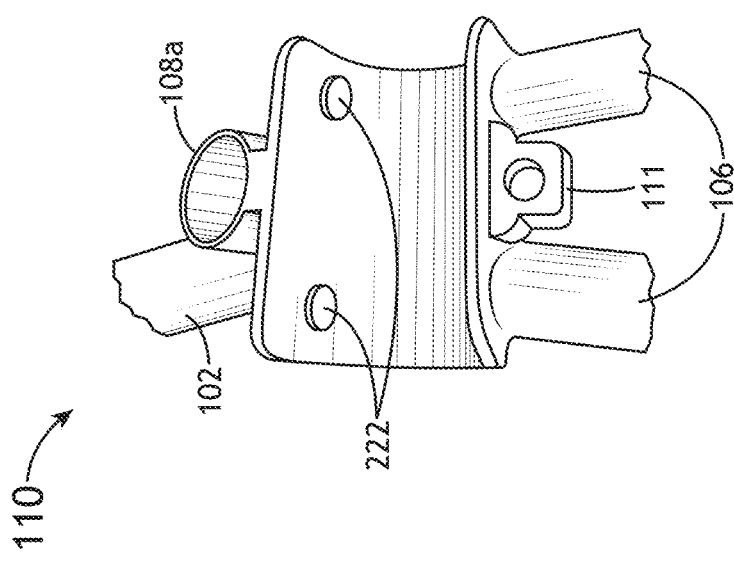
FIG. 2C illustrates an attachment receiver, in accordance with one or more embodiments of the present disclosure.

In another embodiment, the bracket 206 and the receiver 110 include one or more protrusions and one or more corresponding apertures. In another embodiment, as illustrated in FIGS. 2A and 2B, the receiver 110 may include one or more round protrusions 202, and the bracket 206 may include one or more corresponding apertures 204. In another embodiment, as illustrated in FIGS. 2C and 2D, the receiver 110 may include one or more shaped protrusions 222, and the bracket 206 may include one or more corresponding apertures 224.

Figure 2H:
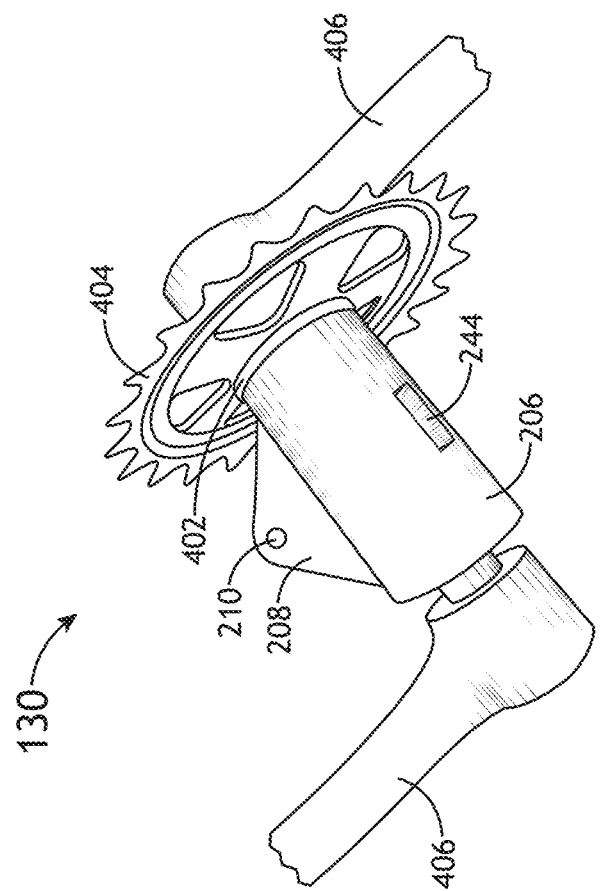
FIG. 2H illustrates an attachment assembly in accordance with one or more embodiments of the present disclosure.
Figure 2G:
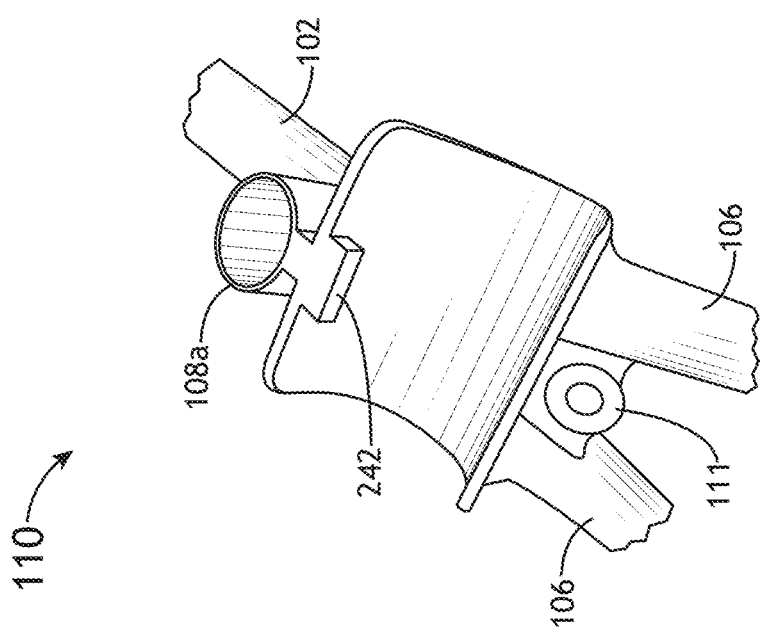
FIG. 2G illustrates an attachment receiver, in accordance with one or more embodiments of the present disclosure.

In another embodiment, as illustrated in FIGS. 2E and 2F, the bracket 206 may include one or more rod-shaped protrusions 234 and the receiver 110 may include one or more corresponding notches 232. In another embodiment, as illustrated in FIGS. 2G and 2H, the receiver 110 may include one or more tab-shaped protrusions 242, and the bracket 206 may include one or more corresponding slots 244.

It is noted herein that the set of protrusions and corresponding apertures are not necessary, and that the bracket assembly 201 may instead be coupled to the receiver 110 via one or more fastener assemblies. For example, the one or more fastener assemblies may include two or more bolts. Therefore, the above description should not be interpreted as a limitation on the scope of the present disclosure but merely an illustration.

Although the sets of protrusions or corresponding apertures embodied in FIGS. 2C-2H are implemented with the pedal assembly 130, it is noted herein that the sets of protrusions and corresponding apertures may instead be implemented with the footrest assembly 120. Therefore, the above description should not be interpreted as a limitation on the scope of the present disclosure but merely an illustration.

In another embodiment, as illustrated in FIGS. 2A and 2B, a chassis plate 111 is coupled to the conversion bicycle 100. For example, the chassis plate 111 may be coupled to the exterior of the receiver 110 and below the rear fork 106. By way of another example, the chassis plate 111 may be coupled to the exterior of the receiver 110 and between the rear fork arms of the rear fork 106. In another embodiment, the chassis plate 111 includes one or more chassis plate apertures 111a. For example, the chassis plate apertures 111a may be threaded. By way of another example, the chassis plate aperture 111a may be coupled to a threaded fastener including, but not limited to, a nut or a bolt.

It is noted herein the chassis plate 111 may instead be a fastener including, but not limited to, a nut or a bolt directly coupled to the rear fork 106, as illustrated in FIGS. 2C-2H. Therefore, the above description should not be interpreted as a limitation on the scope of the present disclosure but merely an illustration.

In another embodiment, the bracket mount plate aperture 210 and the chassis plate aperture 111a are aligned when the bracket assembly 201 is coupled to the receiver 110. In another embodiment, one or more fasteners couple the bracket mount plate 208 and the chassis plate 111 together. For example, one or more bolts 212 may be passed through the apertures 210 and 111a and threaded through a nut coupled to the chassis plate 111. By way of another example (not shown), one or more nuts may be threaded onto one or more threaded rods coupled to the chassis plate 111 and passed through the apertures 210 and 111a.

Although embodiments of the present disclosure are directed to the set of protrusions and the corresponding apertures being located near the section 108a of the seat tube 108, and the chassis plate 111 being located near the rear wheel 107 end of the conversion bicycle 100, it is noted herein that the locations may be switched. In this regard, the set of protrusions and corresponding apertures and the fastener system through the chassis plate 111 provide counterbalance coupling points when coupling the bracket assembly 201 to the receiver 110. Therefore, the above description should not be interpreted as a limitation on the scope of the present disclosure but merely an illustration.

Figure 3A:
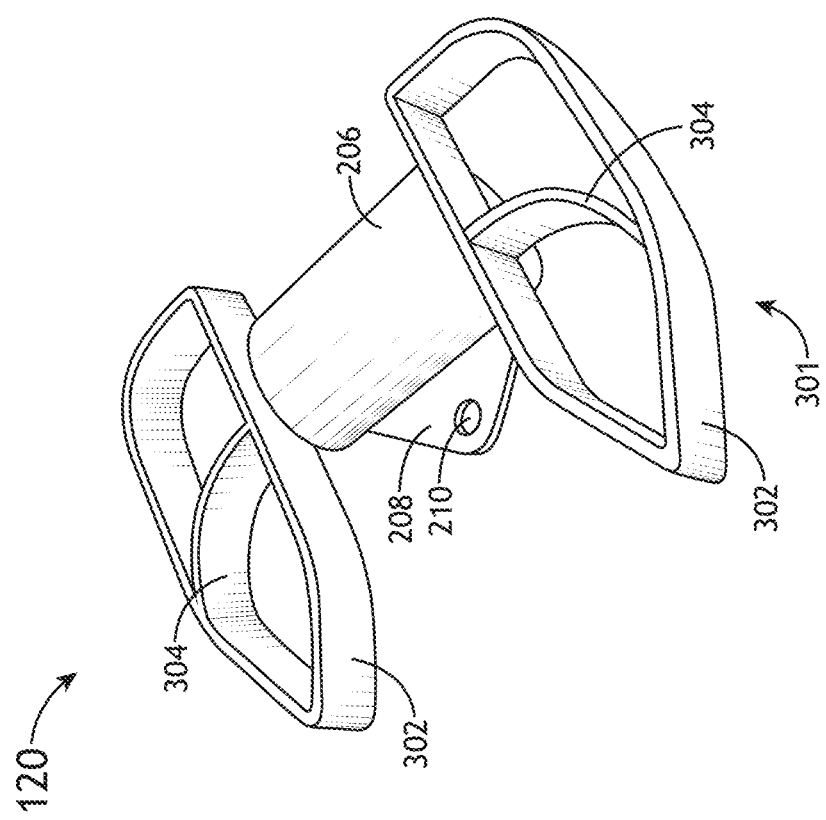
FIG. 3A illustrates a footrest assembly, in accordance with one or more embodiments of the present disclosure.
Figure 3B:
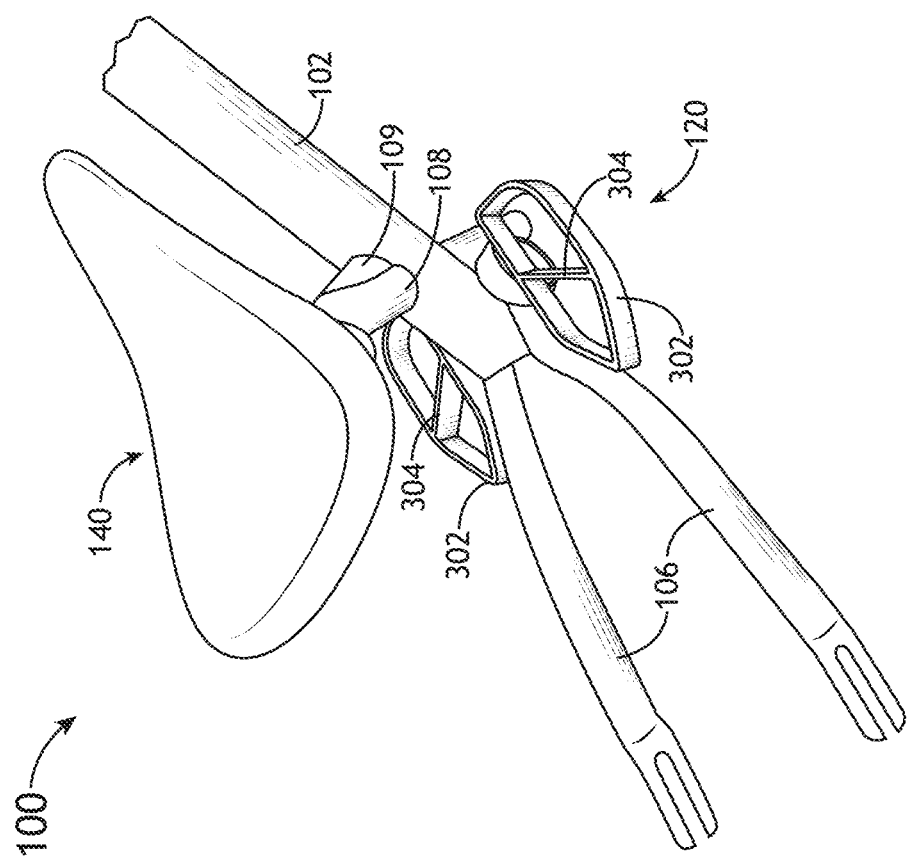
FIG. 3B illustrates a footrest assembly, in accordance with one or more embodiments of the present disclosure.
Figure 3C:
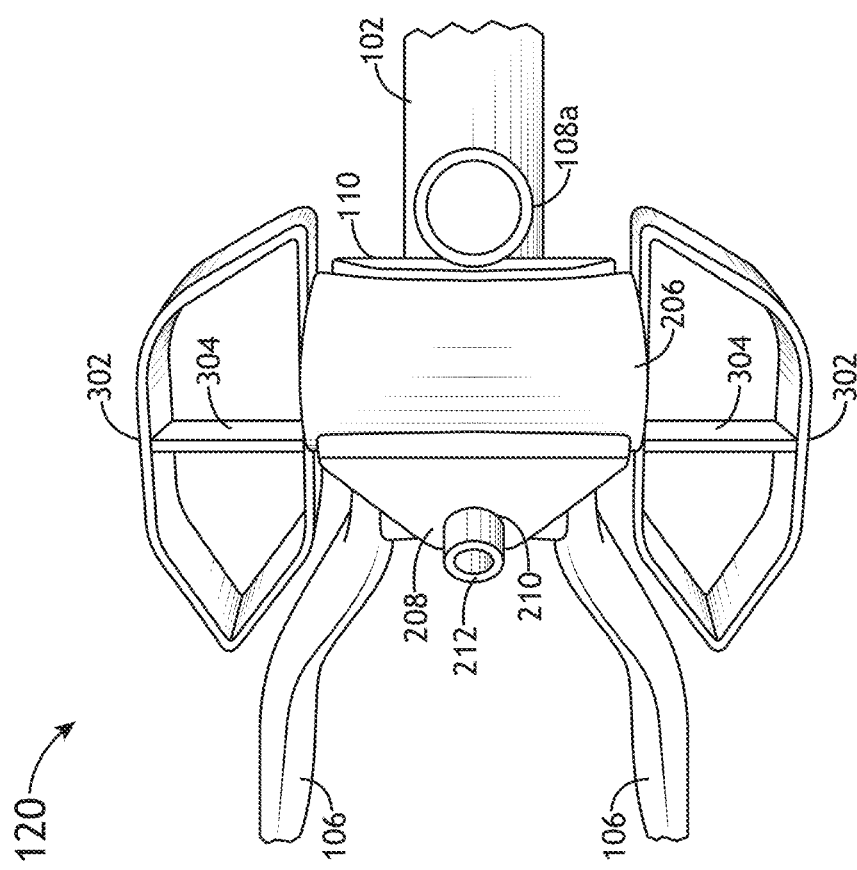
FIG. 3C illustrates a footrest assembly, in accordance with one or more embodiments of the present disclosure.

FIGS. 3A-3C illustrate the footrest assembly 120, in accordance with one or more embodiments of the present disclosure.

In one embodiment, the attachment assembly includes the footrest assembly 120. In another embodiment, the at least one conversion component of the footrest assembly 120 includes one or more footrests 301 (e.g. a left footrest 301 and a right footrest 301). In another embodiment, the one or more footrests 301 are coupled to the bracket 206. For example, the footrests 301 are permanently affixed to the bracket 206. By way of another example, the footrests are reversibly coupled to one or more components coupled to the bracket 206. In another embodiment, each footrest 301 includes a footrest frame 302. For example, the footrest frame 302 may be contoured to map to at least one of the first rear fork arm or the second rear fork arm of the rear fork 106. By way of another example, the shape of the footrest frame 302 may be independent of the first rear fork arm or the second rear fork arm of the rear fork 106. In another embodiment, the footrest frame 302 includes one or more footrest support members 304. For example, the one or more footrest support members 304 may be contoured to map to a side of the foot rest frame 302. By way of another example, the one or more footrest members 304 may be independent of the footrest frame 302.

It is noted that a width of the footrest frame 302 allows a user to stride around the outside of the footrests 301 without injury, such as bruising of the user's calves, shins, or ankles. For example, the footrest frame 302 width may range from, but is not limited to, 0.5 inches to 5 inches. For instance, the footrest frame 302 width may be, but is not limited to, 1.5 inches.

In another embodiment, a width of the conversion bicycle 100 is defined by the distance between the outside edge of the left footrest 301 and the outside edge of the right footrest 301. For example, the conversion bicycle 100 width may range from, but is not limited to, 3 inches to 15 inches. For instance, the conversion bicycle 100 width may be, but is not limited to, 5.6 inches.

In another embodiment, the footrest 301 is coupled to the bracket 206 such that the footrest 301 is offset a selected angle from the horizontal plane (e.g. the ground plane). In another embodiment, the footrest 301 is coupled to the bracket 206 such that the footrest 301 is substantially parallel to the horizontal plane.

Although embodiments of the present disclosure are directed to selected designs of the footrests 301, it is noted herein that the conversion bicycle 100 may instead include a number of additional and/or alternative footrest designs. For example, the footrest 301 may be shaped like a pedal 408, described in detail further herein. By way of another example, the footrest 301 may include a number of additional and/or alternative bicycle pedal designs. By way of another example, the footrest 301 may include clipless pedal hardware. By way of another example, the footrest 301 may include toe clip (or toe cage) pedal hardware. Therefore, the above description should not be interpreted as a limitation on the scope of the present disclosure but merely an illustration.

Figure 3D:
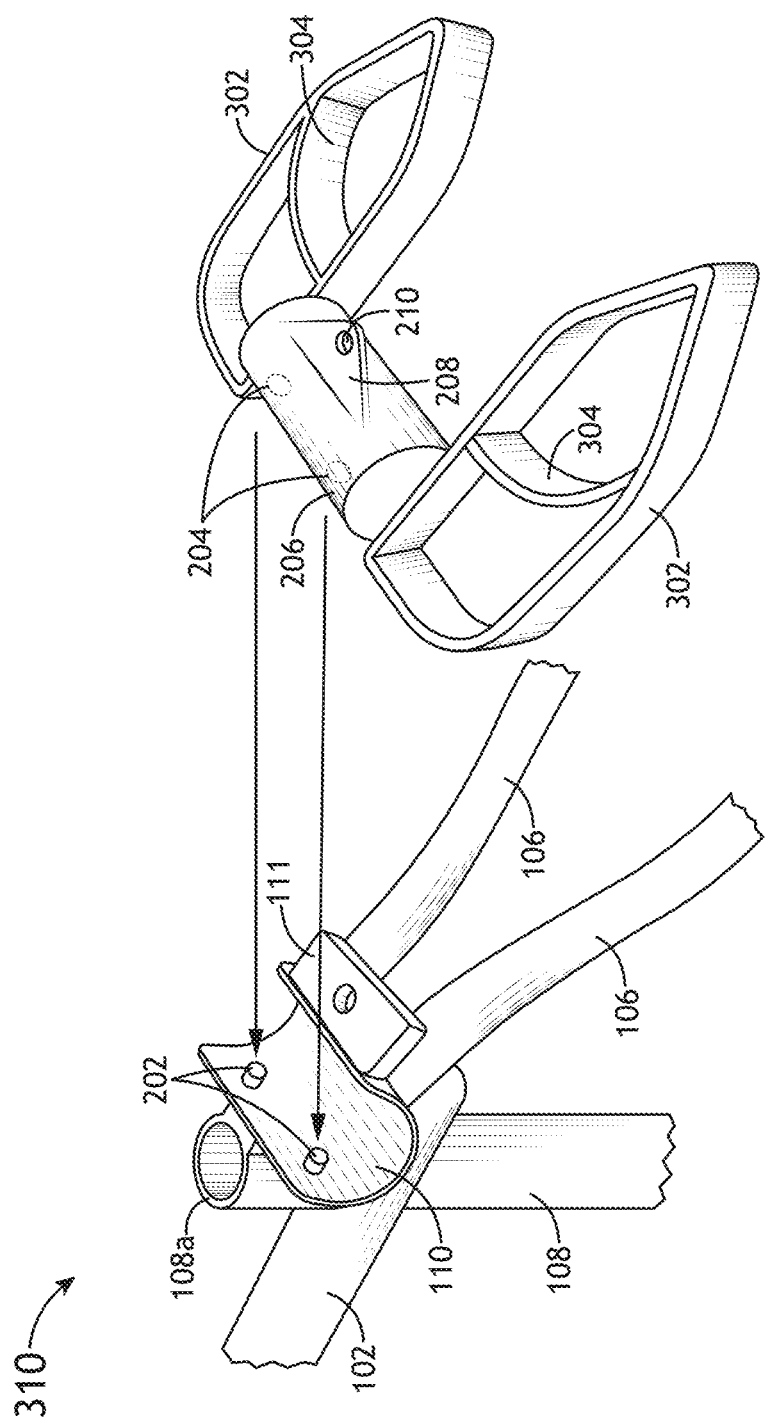
FIG. 3D illustrates an isometric view of the coupling of a footrest assembly, in accordance with one or more embodiments of the present disclosure.
Figure 3E:
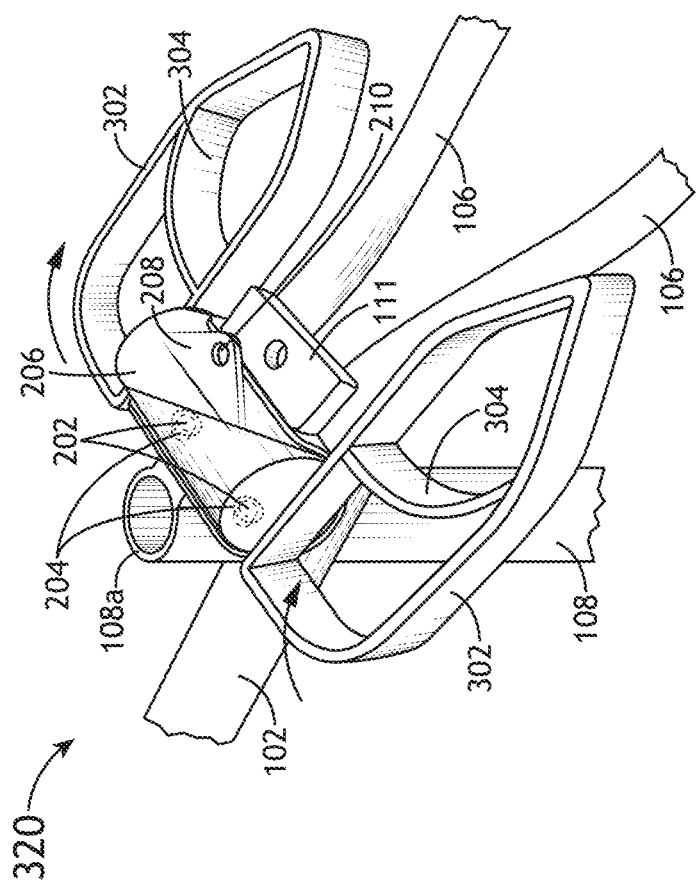
FIG. 3E illustrates an isometric view of the coupling of a footrest assembly, in accordance with one or more embodiments of the present disclosure.
Figure 3F:
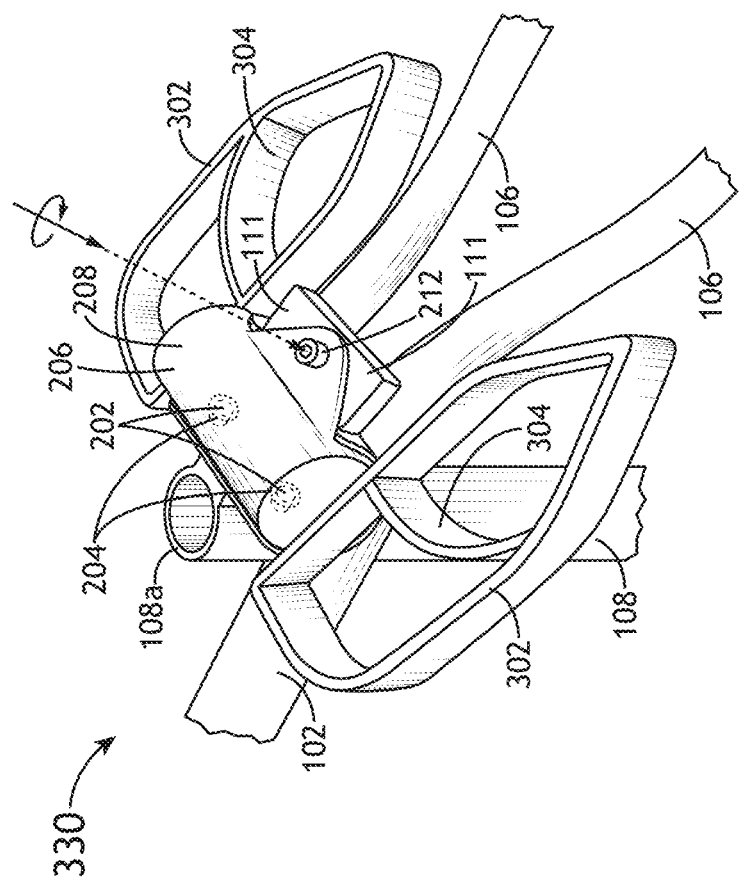
FIG. 3F illustrates an isometric view of the coupling of a footrest assembly, in accordance with one or more embodiments of the present disclosure.

FIGS. 3D-3F illustrate an isometric view of the coupling of the footrest assembly 120 to the receiver 110, in accordance with one or more embodiments of the present disclosure. In view 310, the footrest assembly 120 is coupled to the receiver 110 by interlocking the one or more protrusions 202 on the receiver 110 with the one or more corresponding apertures 204 in the bracket 206. In view 320, the footrest assembly 120 is rotated within the receiver 110 to align the bracket mount plate aperture 210 with the chassis plate aperture 111a. In view 330, the footrest assembly 120 is coupled to the chassis plate 111 via the aligned bracket mount plate aperture 210 and chassis plate aperture 111a.

Figure 3G:
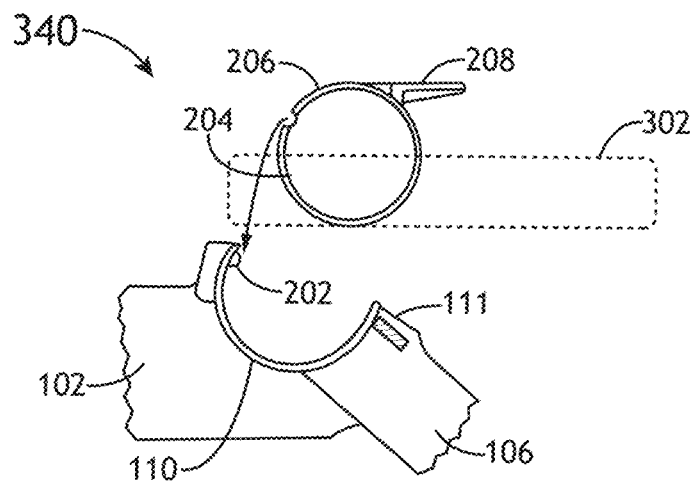
FIG. 3G illustrates a side view of the coupling of a footrest assembly, in accordance with one or more embodiments of the present disclosure.
Figure 3H:
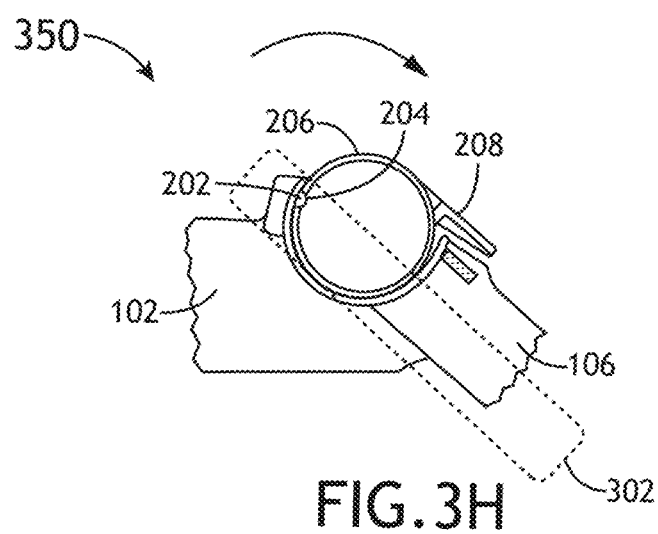
FIG. 3H illustrates a side view of the coupling of a footrest assembly, in accordance with one or more embodiments of the present disclosure.
Figure 3I:
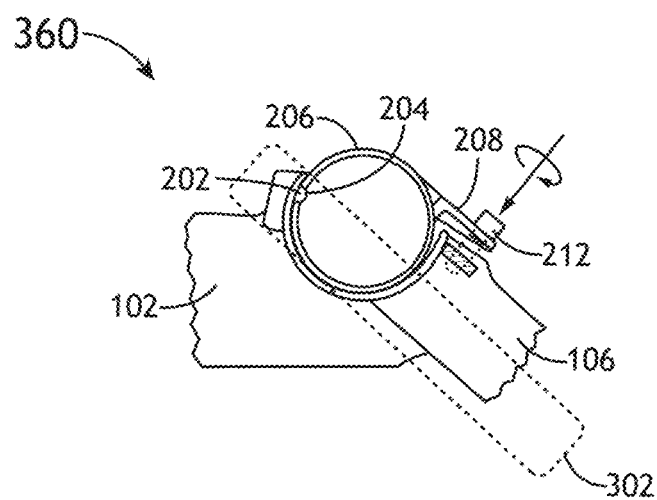
FIG. 3I illustrates a side view of the coupling of a footrest assembly, in accordance with one or more embodiments of the present disclosure.

FIGS. 3G-3I illustrate a side view of the coupling of the footrest assembly 120 to the receiver 110, in accordance with one or more embodiments of the present disclosure. In view 340, the footrest assembly 120 is coupled to the receiver 110 by interlocking the one or more protrusions 202 on the receiver 110 with the one or more corresponding apertures 204 in the bracket 206. In view 350, the footrest assembly 120 is rotated within the receiver 110 to align the bracket mount plate aperture 210 with the chassis plate aperture 111a. In view 360, the footrest assembly 120 is coupled to the chassis plate 111 via the aligned bracket mount plate aperture 210 and chassis plate aperture 111a.

When coupling the footrest assembly 120 to the chassis plate 111 via the aligned bracket mount plate aperture 210 and chassis plate aperture 111a, as in views 330 and 360, a bolt 212 may be passed through the apertures 210 and 111a and threaded through a nut coupled to the chassis plate 111. By way of another example (not shown), a nut may be threaded onto one or more threaded rods coupled to the chassis plate 111 and passed through the apertures 210 and 111a. It is noted herein the bolt 212 and corresponding nut may instead be any fastener known in the art.

Although embodiments of the present disclosure are directed to the receiver 110 including the protrusions 202 and the bracket 206 of the footrest assembly 120 including the corresponding apertures 204, it is noted herein that any of the sets of protrusions and corresponding apertures illustrated in FIGS. 2C-2H (e.g. 222/224, 232/234, 242/244) may instead be incorporated into the receiver 110 and footrest assembly 120. Therefore, the above description should not be interpreted as a limitation on the scope of the present disclosure but merely an illustration.

FIGS. 4A-4D illustrate the pedal assembly 130, in accordance with one or more embodiments of the present disclosure.

In one embodiment, the attachment assembly includes the pedal assembly 130. In another embodiment, the at least one conversion component of the pedal assembly 130 includes a crankset 401. In another embodiment, the crankset 401 includes a bearing assembly 402. In another embodiment, the bearing assembly 402 of the crankset 401 is coupled to the bracket 206 of the bracket assembly 201. In another embodiment, the bearing assembly 402 includes one or more bearings coupled to a central shaft, where the central shaft extrudes from both ends of the bracket 206.

In another embodiment, the crankset 401 includes a transmission assembly. In another embodiment, the transmission assembly includes a main transmission component coupled to one end of the central shaft. For example, the main transmission component may include a main sprocket 404 (e.g. a single gear). By way of another example, the transmission component may include a chainset including one or more gears. By way of another example, the main transmission component may include a main toothed pulley. By way of another example, the main transmission component may include a main smooth pulley.

In another embodiment, the transmission assembly includes a rear transmission component coupled to the rear wheel 107. For example, the rear transmission component may include a rear sprocket 410 (e.g. a single gear). By way of another example, the rear transmission component may be a cassette including one or more gears. By way of another example, the rear transmission component may include a rear toothed pulley. By way of another example, the rear transmission component may include a rear smooth pulley.

In another embodiment, the transmission assembly includes a power transmission component coupled to the main transmission component and the rear transmission component. For example, the power transmission component may include a chain 412. By way of another example, the power transmission component may include a toothed belt. By way of another example, the power transmission component may include an elastic band.

It is noted that increasing the ease by which a user learns to ride a bicycle requires incorporating selected dimensions into the design of the conversion bicycle 100.

For example, the design may incorporate a selected height of the seat assembly 140. For instance, a seat assembly 140 having a sitting surface lower (e.g. closer) to the ground may allow for a user to touch the ground and hold the bicycle upright. Additionally, the seat assembly 140 with a sitting surface lower to the ground (e.g. closer) may allow for a user to propel the bicycle forward to a selected speed, while maintaining at least a minimum amount of balance and momentum, before powering the bicycle via the crankset 401 of the pedal assembly 130. It is noted the seat assembly 140 is described in detail further herein.

By way of another example, the design may incorporate a selected length of the pedal crank 406 coupled to the bearing assembly 402 of the crankset 401. For instance, a shorter pedal crank 406 may allow for a selected distance from the seat assembly 140 to a pedal 408 coupled to the pedal crank 406, where the selected distance promotes a preferred amount of leg extension by the user at both the bottom of a downstroke and the top of an upstroke during actuation of the pedal assembly 130. Additionally, the shorter pedal crank 406 may allow for attaching the bracket assembly 201 to an attachment receiver 110 coupled to the chassis 101 lower (e.g. closer) to the ground. It is noted herein, however, that the distance of the attachment receiver 110 from the ground is also dependent of the unevenness of the ground terrain and lean angle clearance set by government regulations.

By way of another example, the design may incorporate a selected width for the pedal 408 coupled to the pedal crank 406. It is noted narrow pedals may allow for attaching the bracket assembly 201 to the chassis 101 lower (e.g. closer) to the ground while still meeting government regulation-required lean angle clearances.

By way of another example, the design may need to incorporate selected dimensions not previously listed herein for any component of the conversion bicycle 100. For instance, the design may need to incorporate selected dimensions in regards to the arrangement of the main tube 102, rear fork 106, and the attachment receiver 110 within the chassis 101, where the selected dimensions may result in a low center of gravity for the conversion bicycle 100, where the selected dimensions may additionally result in a lower seat height on the conversion bicycle 100 than on a traditional bicycle. Therefore, the above description should not be interpreted as a limitation on the scope of the present disclosure but merely an illustration.

In another embodiment, the crankset 401 includes the pedal crank 406 coupled to each end of the central shaft through the bearing assembly 402 (e.g. a left pedal crank 406 and a right pedal crank 406). In another embodiment, the pedal crank 406 is shorter in length than a traditional pedal crank, with the length of a pedal crank 406 measured from the center point of the central shaft in the bearing assembly 402 to the center point of a pedal 408 spindle, the pedal 408 described in detail further herein. For example, the pedal crank 406 length may range from, but is not limited to, 60 mm to 200 mm (2.36 inches to 7.87 inches). For instance, the pedal crank 406 length may be, but is not limited to, 76 mm (2.99 inches).

In another embodiment, the end of the pedal crank 406 in the downstroke position should be no closer than 2 inches to the ground, to ensure the pedal crank 406 does not hit the ground during the downstroke when the bicycle 100 is used on rough and/or uneven terrain.

In another embodiment, the pedal crank 406 allows the seat assembly 140 to be adjusted to a height that is lower (e.g. closer) to the ground than on a bicycle with traditional pedal cranks, which allows for the user to propel the conversion bicycle 100 by striding instead of having to rely only on the pedal assembly 130. Additionally, the pedal crank 406 increases the relative distance between the seat height and the pedal assembly 130 to allow for a nearly-full leg extension and maximum pedal efficiency, which promotes an easier process for learning to pedal. It is noted herein that a user's maximum pedal efficiency is affected by the ratio of the pedal crank 406 length to the rider height, with maximum pedal efficiency for a child occurring when the pedal crank 406 is approximately 9.5% of the height of the child, or with maximum pedal efficiency for an adult occurring when the pedal crank 406 is approximately 10% of the height of the adult. Further, the shorter-length pedal cranks 406 reduce the dead spot at the top and bottom points of the upstroke and downstroke, respectively, where the dead spot requires greater force to propel the conversion bicycle 100, which promotes an easier process for learning to pedal.

It is noted herein that maximum pedal efficiency is also affected by a Q-factor, where the Q-factor is the width of the bicycle 100 between a pedal 408 mounting surface of the left pedal crank 406 and a pedal 408 mounting surface of the right pedal crank 406, where the above-defined width includes at least the width of the chassis 101, the width of the attachment receiver 110 and bracket assembly 201, the shallowness of the pedal crank 406 bend, and the width of pedals 408 (described in detail further herein). It is further noted herein that a smaller Q-factor is preferable for children than for adults, which allows the outside edges of the child rider's feet to be equal to or narrower than the outermost dimension of the child rider's hips.

In another embodiment, the crankset 401 includes a pedal 408 coupled to each pedal crank 406 (e.g. a left pedal 408 and a right pedal 408).

It is noted that a width of the pedal 408 allows a user to stride around the outside of the pedal 408 without injury, such as bruising of the user's calves, shins, or ankles. For example, the pedal 408 width may range from, but is not limited to, 1 inch to 5 inches. For instance, the pedal 408 width may be, but is not limited to, 2 inches.

In another embodiment, a width of the conversion bicycle 100 is defined by the distance between the outside edge of the left pedal 408 and the outside edge of the right pedal 408. For example, the conversion bicycle 100 width may range from, but is not limited to, 4 inches to 20 inches. For instance, the conversion bicycle 100 width may be, but is not limited to, 10 inches.

Figure 4B:
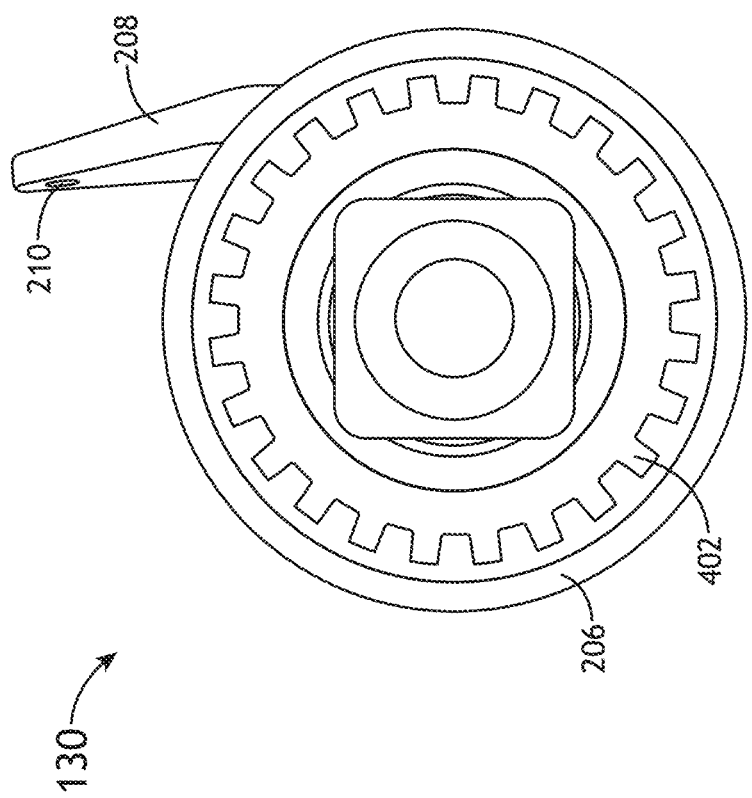
FIG. 4B illustrates a pedal assembly, in accordance with one or more embodiments of the present disclosure.
Figure 4C:
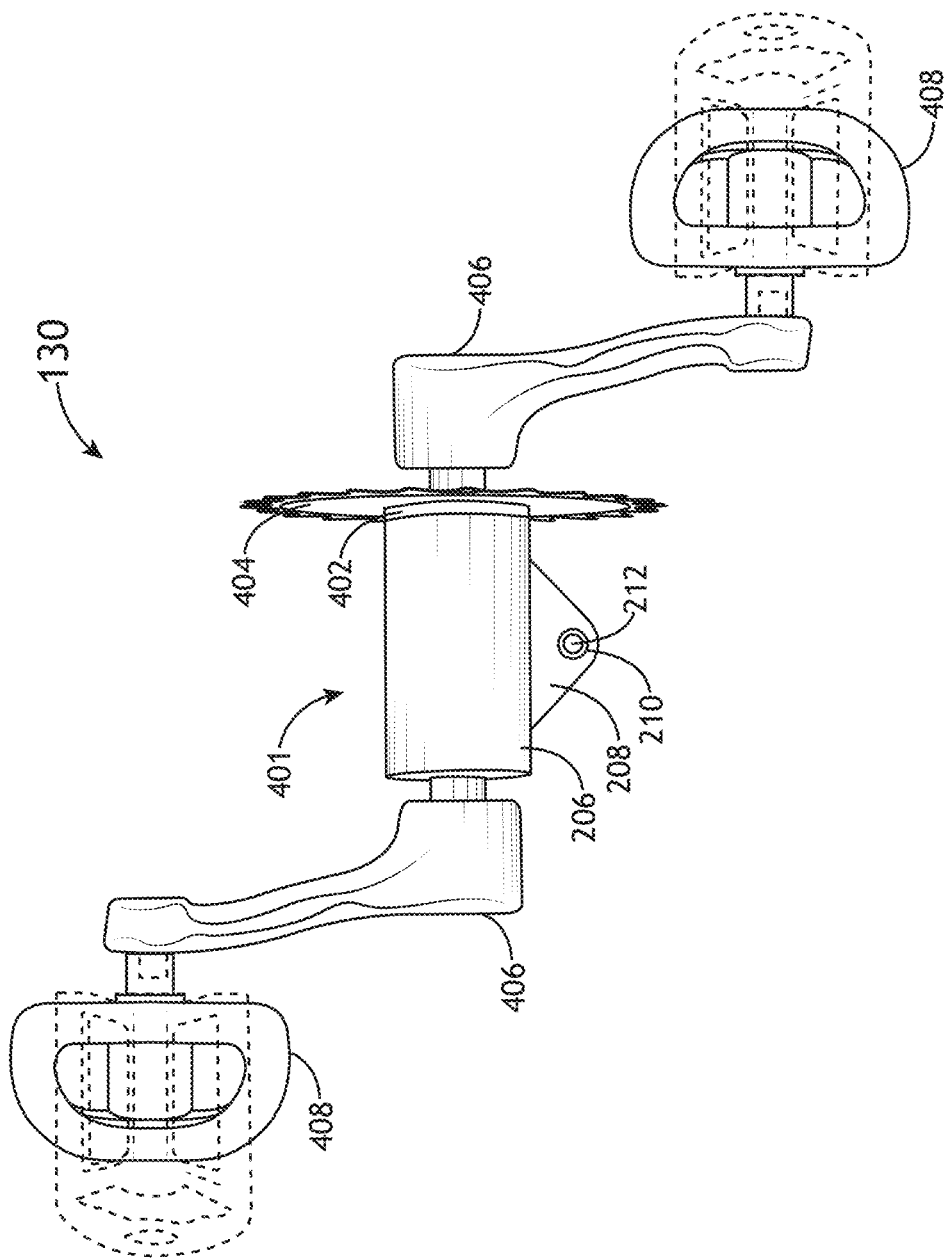
FIG. 4C illustrates a pedal assembly, in accordance with one or more embodiments of the present disclosure.
Figure 4D:
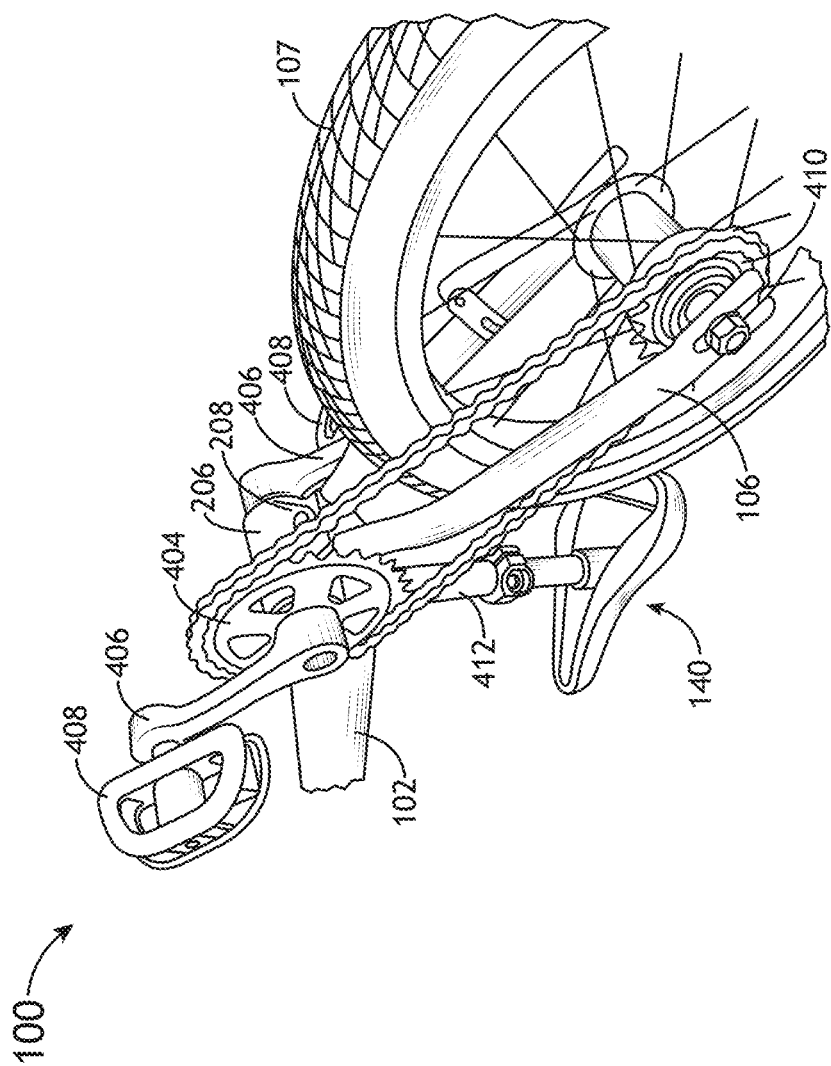
FIG. 4D illustrates a view of a pedal assembly coupled to a conversion bicycle apparatus, in accordance with one or more embodiments of the present disclosure.
Figure 4E:
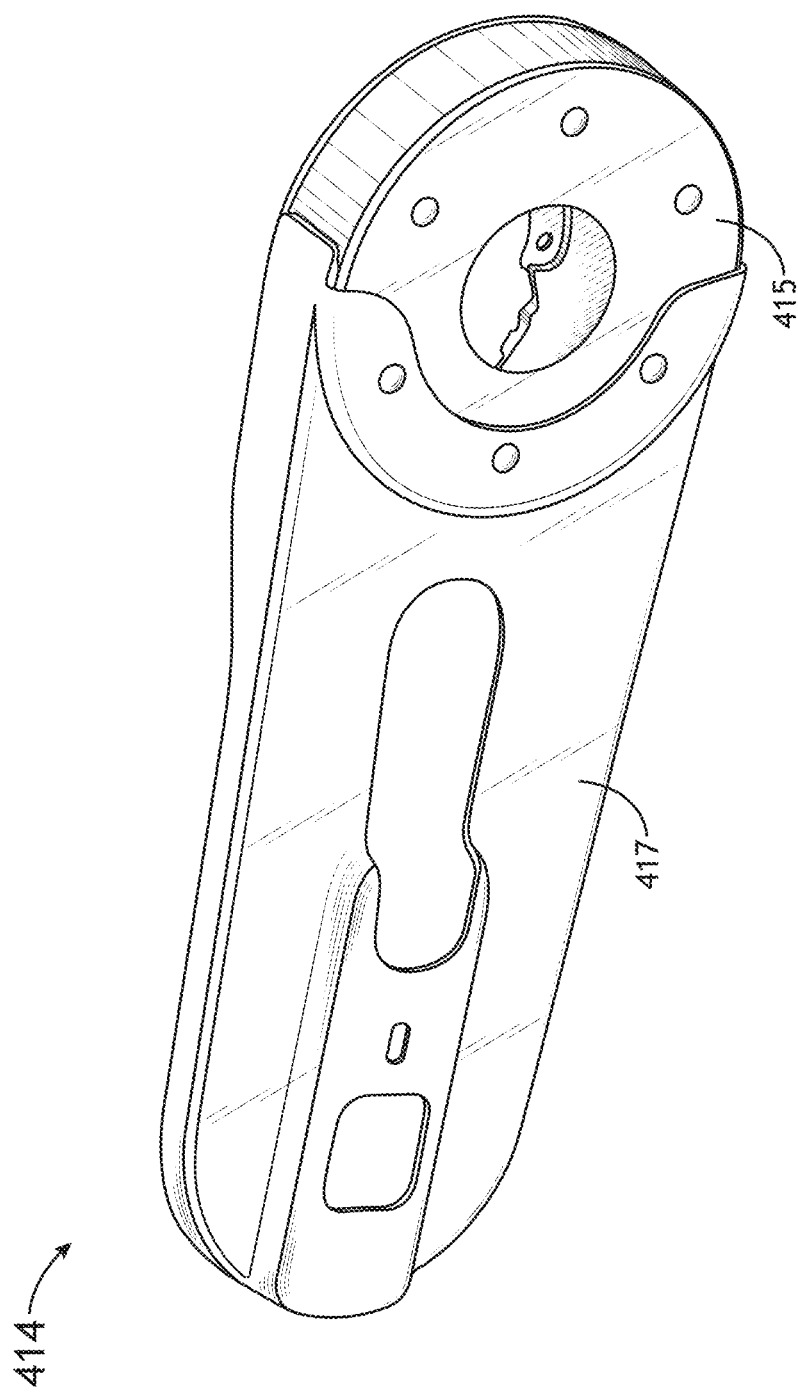
FIG. 4E illustrates a chain guard for a pedal assembly, in accordance with one or more embodiments of the present disclosure.
Figure 4F:
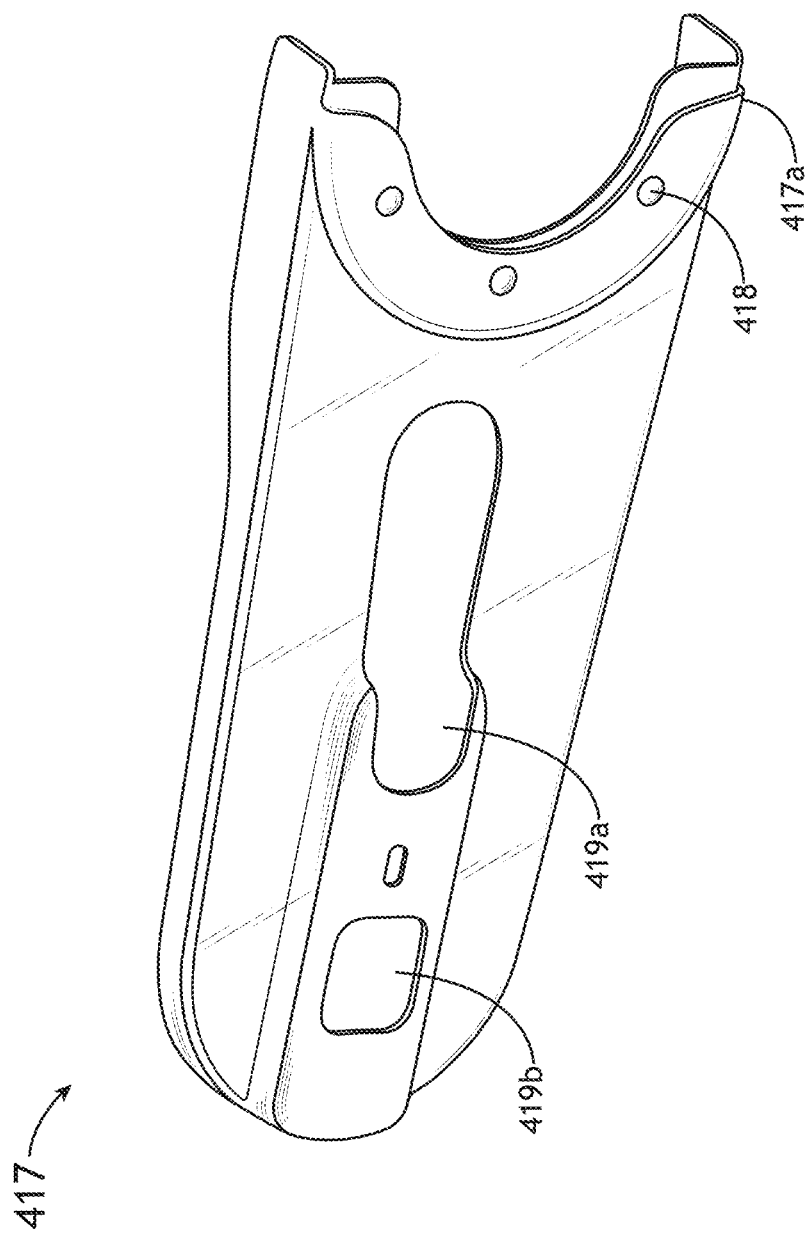
FIG. 4F illustrates a rear cover of a chain guard for a pedal assembly, in accordance with one or more embodiments of the present disclosure.
Figure 4G:
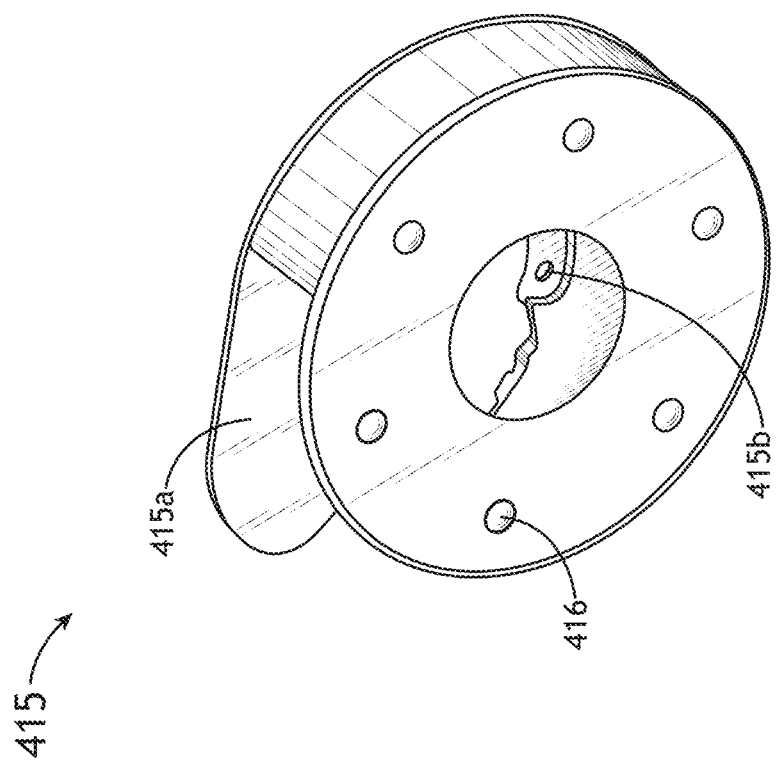
FIG. 4G illustrates a forward ring of a chain guard for a pedal assembly, in accordance within one or more embodiments of the present disclosure.

In another embodiment, as illustrated in FIG. 4C, the pedal 408 is narrower than a traditional bicycle pedal. In contrast, a wider traditional bicycle pedal may hinder the striding motion of the user. Additionally, the wider traditional bicycle pedal may injure the user, bruising the user's calves, shins, or ankles.

It is noted herein that government regulations require a certain lean angle before a bicycle pedal makes contact with the ground, where the lean angle is measured with the pedal at the bottom of the downstroke. For example, the United States government requires a 25-degree lean angle. With a traditional-width bicycle pedal and traditional-length bicycle pedal crank, a regulated angle is achieved by raising the mount location of the bicycle crankset on the bicycle chassis. In turn, a seat must be raised to accommodate the raised crankset, which makes it harder for the user to touch the ground when wanting to propel the conversion bicycle 100 by striding instead of with the crankset 401. In contrast, the shorter-length pedal cranks 406 with narrower pedals allow for the pedal assembly 130 to be mounted on the conversion bicycle 100 at a distance lower (e.g. closer) to the ground while still meeting the regulated angle. Additionally, the narrower pedals 408 also allow for the pedal assembly 130 to be mounted on the conversion bicycle 100 at a distance lower (e.g. closer) to the ground while still meeting the regulated angle.

In another embodiment, the combination of the height of a seat 502 of the seat assembly 140, the length of the pedal crank 406, and width of the pedal 408 (or the footrest 302) allows the chassis 101 to have a selected lean angle. For example, the selected lean angle may range from, but is not limited to, 0 degrees to 35 degrees. For instance, the selected lean angle may be, but is not limited to, 25 degrees.

Although embodiments of the present disclosure are directed to using the short-length pedal crank 406, it is noted herein that the conversion bicycle 100 may instead include a number of additional and/or alternative pedal cranks designs. Additionally, although embodiments of the present disclosure are directed to using the narrow pedal 408, it is noted herein that the conversion bicycle 100 may instead include a number of additional and/or alternative pedal designs. For example, the pedal 408 may be shaped like a traditional bicycle pedal, as illustrated by the dotted lines in FIG. 4C. By way of another example, the pedal 408 may include clipless pedal hardware. By way of another example, the pedal 408 may include toe clip (or toe cage) pedal hardware. Therefore, the above description should not be interpreted as a limitation on the scope of the present disclosure but merely an illustration.

FIGS. 4E-4I illustrate a chain guard 414 for the pedal assembly 130, in accordance with one or more embodiments of the present disclosure.

In one embodiment, the bicycle 100 includes a chain guard 414. In another embodiment, the chain guard 414 protects a user, or clothing worn by the user, from becoming entangled with at least one of the main sprocket 404 and the chain 412. In another embodiment, the chain guard 414 includes a forward ring 415. In another embodiment, the chain guard 414 includes a rear cover 417.

In another embodiment, the forward ring 415 includes a ring body. In another embodiment, the ring body includes one or more mount plates 415a. In another embodiment, the mount plates 415a are positioned in an offset gap between the main sprocket 404 and the bearing assembly 402 within the bracket 201. In another embodiment, the forward ring 415 is reversibly couplable to the attachment receiver 110 via one or more fasteners through one or more mount plate apertures 415b within the one or more mount plates 415a to one or more tab-shaped protrusions affixed to the attachment receiver 110. It is noted herein the forward ring 415 may be designed to be self-attaching, such that fasteners are not required. Therefore, the above description should not be interpreted as a limitation on the scope of the present disclosure but merely an illustration.

In another embodiment, the forward ring 415 includes one or more protrusions 416 on a surface of the ring body. In another embodiment, the rear cover 417 includes a rear cover body. In another embodiment, the rear cover body includes a raised portion 417a. In another embodiment, the raised portion 417a includes one or more apertures 418 that interlock with the protrusions 416 on the surface of the ring body. In another embodiment, the rear cover 417 is reversibly couplable to the forward ring 415 via the protrusions 416 and interlocking apertures 418.

In another embodiment, the rear cover 417 (and subsequently the chain guard 414) accommodates one or more components of the conversion bicycle 100 via one or more access apertures within the rear cover body. For example, the rear cover 417 may include a first access aperture 419a, where the first access aperture 419a accommodates at least one of the first rear fork arm and/or the second rear fork arm of the rear fork 106. By way of another example, the rear cover 417 may include a second access aperture 419b, where the second access aperture 419b accommodates a nut holding the rear wheel 107 to the rear fork 106. By way of another example, the rear cover 419 may include at least a third access aperture.

Figure 4H:
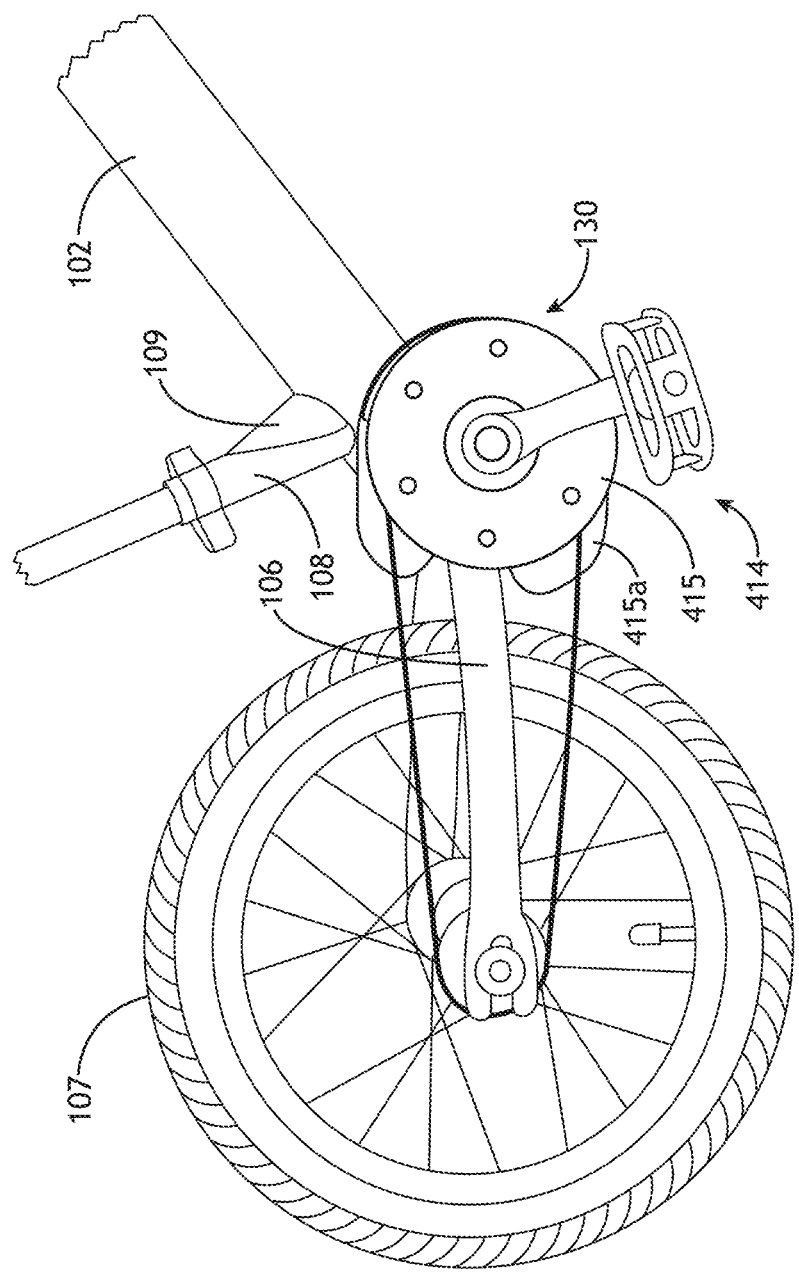
FIG. 4H illustrates a side view of a chain guard assembly coupled to a conversion bicycle apparatus, in accordance with one or more embodiments of the present disclosure.

In one embodiment, as illustrated in FIG. 4H, the chain guard 414 is reversibly couplable to the conversion bicycle 100 and includes only the forward ring 415. For example, the forward ring 415 may be reversibly couplable to the conversion bicycle 100 as a factory add-on. By way of another example, the forward ring 415 may be shipped with the conversion bicycle 100 as an accessory add-on. By way of another example, the forward ring 415 may be a purchasable accessory add-on for the conversion bicycle 100.

Figure 4I:
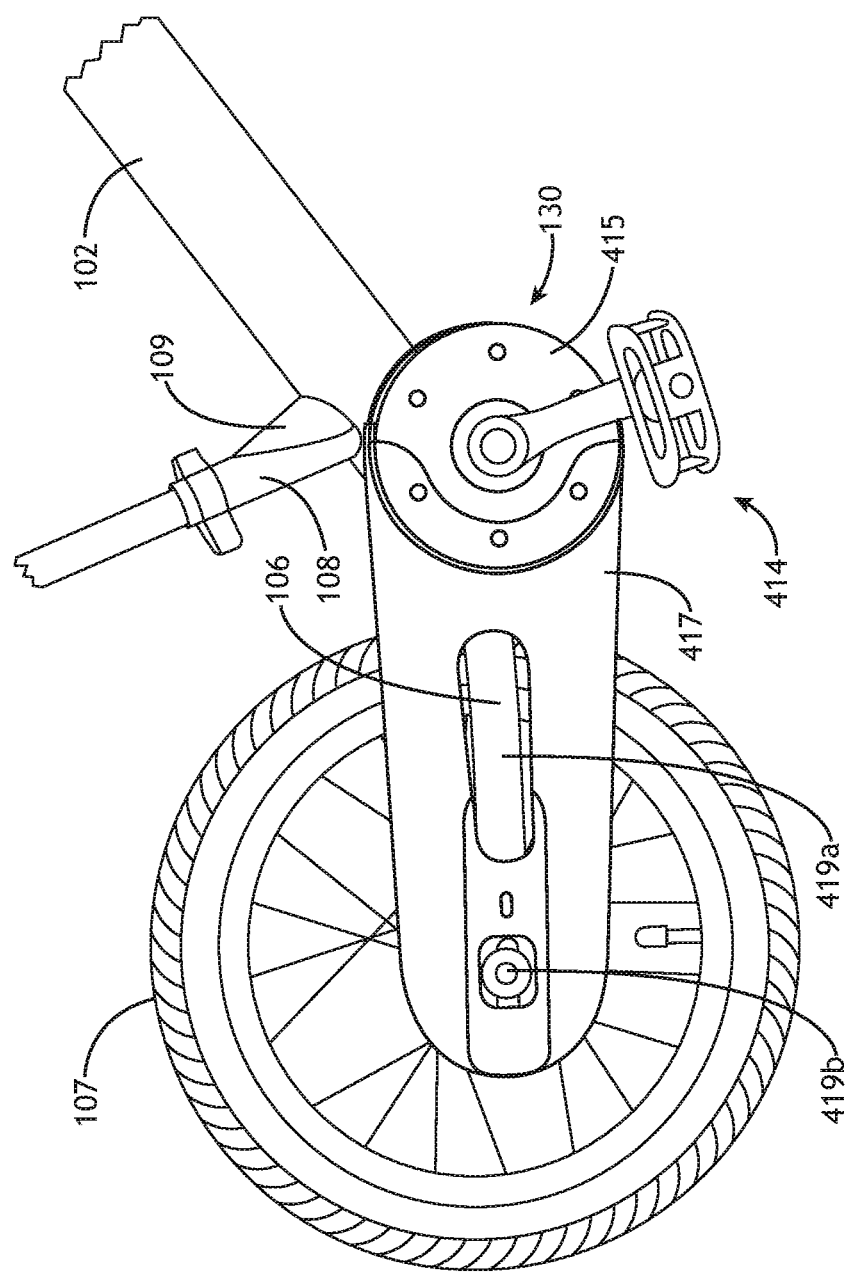
FIG. 4I illustrates a side view of a chain guard assembly coupled to a conversion bicycle apparatus, in accordance with one or more embodiments of the present disclosure.
Figure 4J:
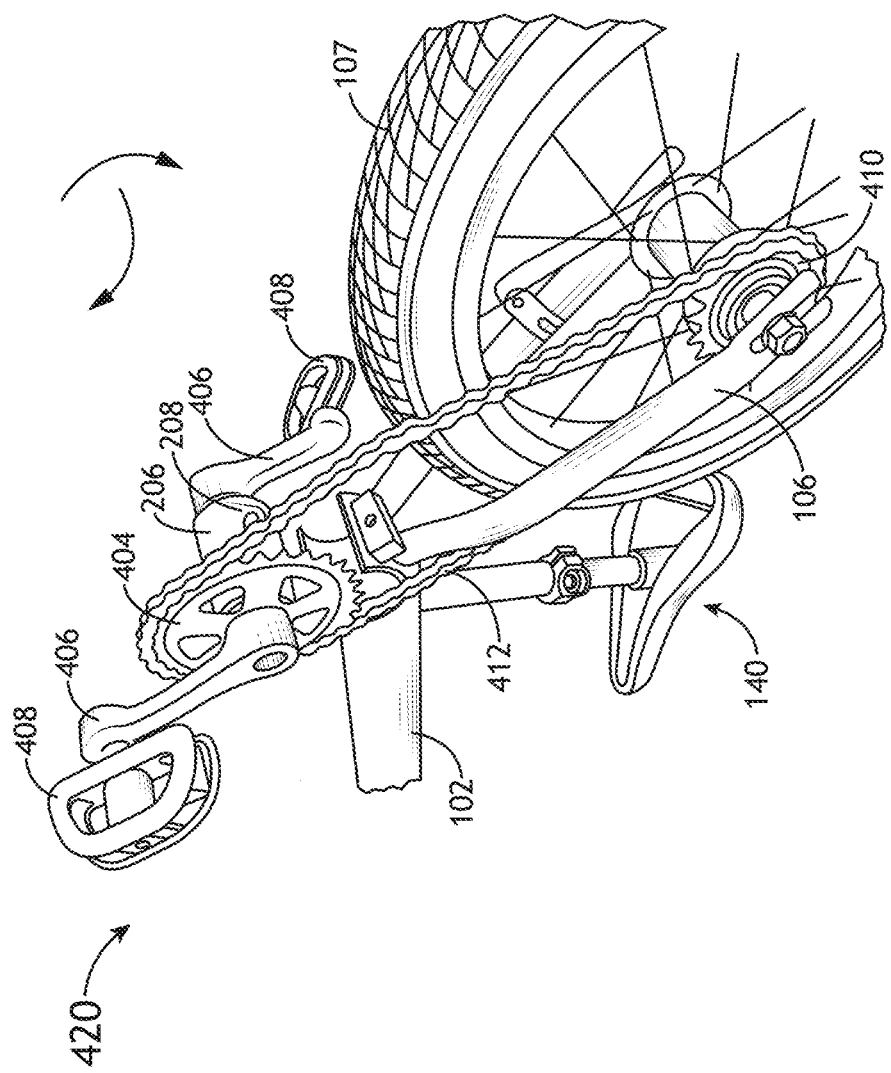
FIG. 4J illustrates an isometric view of the coupling of a pedal assembly, in accordance with one or more embodiments of the present disclosure.
Figure 4K:
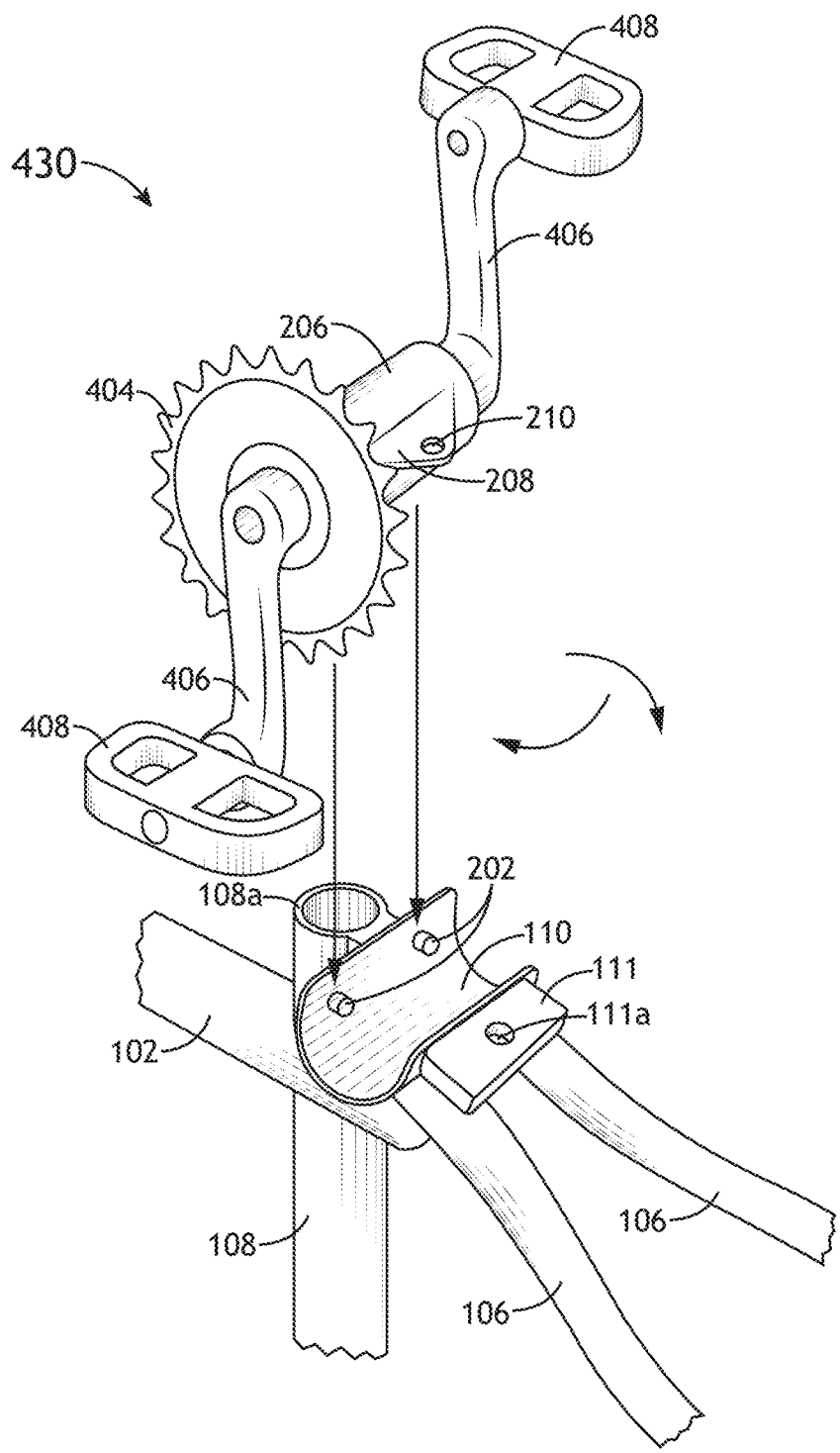
FIG. 4K illustrates an isometric view of the coupling of a pedal assembly, in accordance with one or more embodiments of the present disclosure.
Figure 4L:
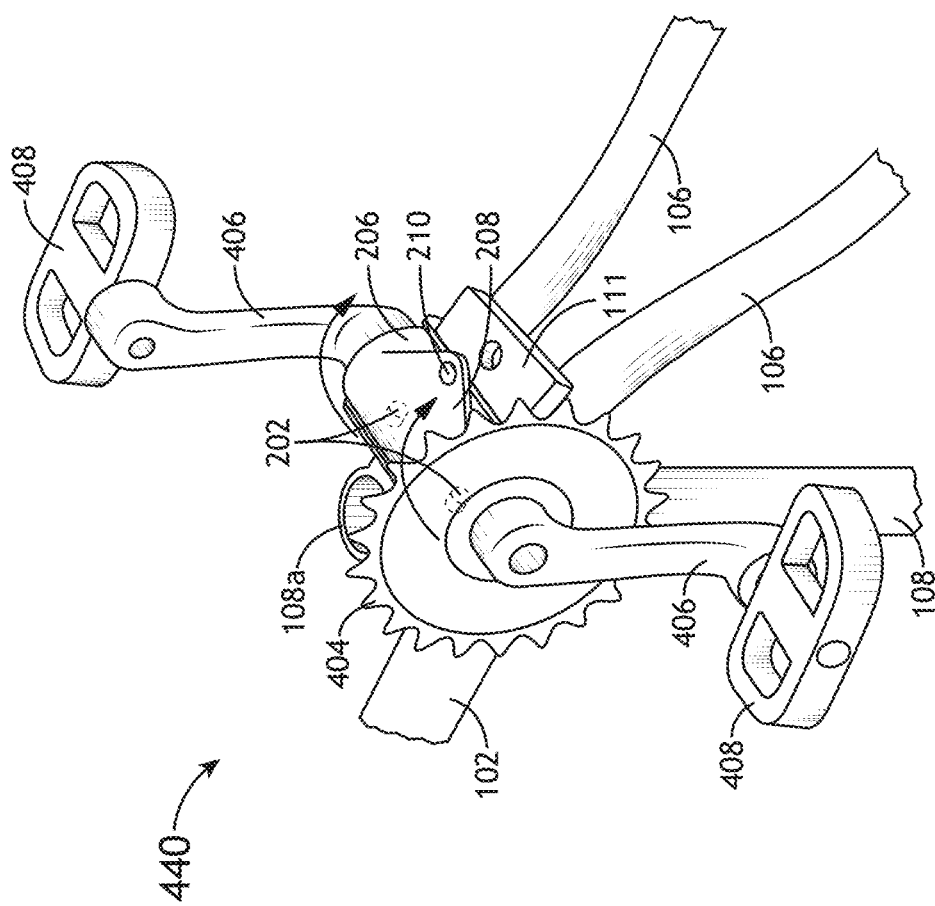
FIG. 4L illustrates an isometric view of the coupling of a footrest assembly, in accordance with one or more embodiments of the present disclosure.
Figure 4M:
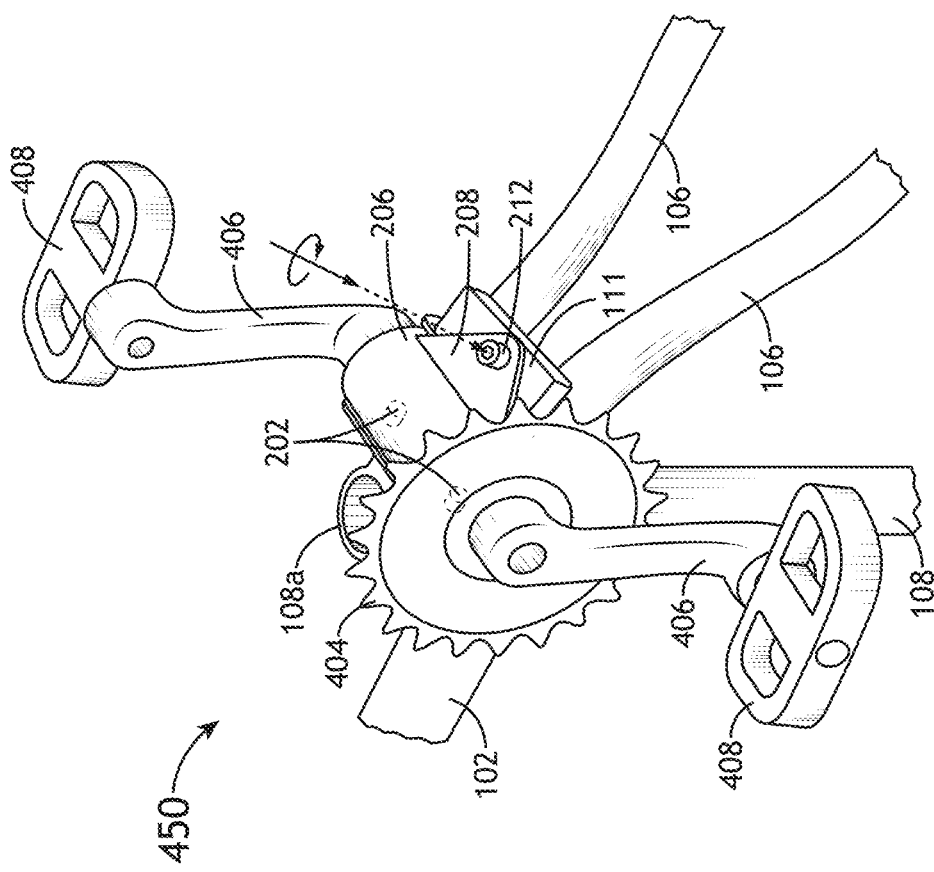
FIG. 4M illustrates an isometric view of the coupling of a pedal assembly, in accordance with one or more embodiments of the present disclosure.

In another embodiment, as illustrated in FIG. 4I, the chain guard 414 is reversibly couplable to the conversion bicycle 100 and includes the forward ring 415 and the rear cover 417. For example, the rear cover 417 may be coupled to the conversion bicycle 100 as a factory add-on, should the forward ring 415 be reversibly couplable to the conversion bicycle 100 as a factory add-on. By way of another example, the rear cover 417 may be shipped with the conversion bicycle 100 as an accessory add-on, should the forward ring be shipped with the conversion bicycle 100 as an accessory add-on. By way of another example, the rear cover may be a purchasable accessory add-on for the conversion bicycle 100, should the forward ring 415 be shipped with the conversion bicycle 100 as an accessory add-on or be a purchasable accessory add-on for the conversion bicycle 100.

In one embodiment, the pedal assembly 130 is coupled to the chassis 101, via a set of steps as described in detail further herein. In another embodiment, the mount plates 415a of the forward ring 415 are slid over the crankset 401 in the offset gap between the main sprocket 404 and the bearing assembly 402 within the bracket 201. In another embodiment, the forward ring 415 is coupled to the attachment receiver 110 via the mount plate apertures 415b. In another embodiment, the rear cover 417 is slid over at least a portion of the forward ring 415, such that the protrusions 416 of the forward ring 415 interlock with the corresponding apertures 418 of the rear cover 417. In another embodiment, the rear cover 417 is adjusted so the access apertures 419a, 419b accommodate one or more components of the conversion bicycle 100.

Although embodiments of the present disclosure are directed to a chain guard 414 having a forward ring 415 and a rear cover 417, it is noted herein the chain guard 414 may be a single piece. Therefore, the above description should not be interpreted as a limitation on the scope of the present disclosure but merely an illustration.

Although embodiments of the present disclosure are directed to a chain guard 414, it is noted herein the chain guard 414 may be modified to instead be a toothed belt guard 414, a smooth belt guard 414, or an elastic band guard 414. Therefore, the above description should not be interpreted as a limitation on the scope of the present disclosure but merely an illustration.

Although embodiments of the present disclosure are directed to the chain guard 414 being reversibly couplable to the conversion bicycle 100, it is noted herein the chain guard 414 may be reversibly couplable to any bicycle. For example, the chain guard 414 may be reversibly couplable to any bicycle as a factory add-on. By way of another example, the chain guard 414 may be shipped with any bicycle as an accessory add-on. By way of another example, the chain guard 414 may be reversibly couplable to any bicycle as a purchasable accessory add-on. Therefore, the above description should not be interpreted as a limitation on the scope of the present disclosure but merely an illustration.

FIGS. 4J-4M illustrate an isometric view of the coupling of the pedal assembly 130 to the receiver 110, in accordance with one or more embodiments of the present disclosure. In view 420, the chain 412 is wrapped around the rear sprocket 410 on the rear wheel 107 without uncoupling or breaking apart the chain 412 from the main sprocket 404, or removing the rear wheel. In view 430, the pedal assembly 130 is coupled to the receiver 110 by interlocking the one or more protrusions 202 on the receiver 110 with the one or more corresponding apertures 204 in the bracket 206. In view 440, the pedal assembly 130 is rotated within the receiver 110 to align the bracket mount plate aperture 210 with the chassis plate aperture 111*a*. In view 450, the pedal assembly 130 is coupled to the chassis plate 111 via the aligned bracket mount plate aperture 210 and chassis plate aperture 111*a*.

FIGS. 4N-4Q illustrate a side view of the coupling of the pedal assembly 130 to the receiver 110, in accordance with one or more embodiments of the present disclosure. In view 460, the chain 412 is wrapped around the rear sprocket 410 on the rear wheel 107 without uncoupling or breaking apart the chain 412 from the main sprocket 404, or removing the rear wheel. In view 470, the pedal assembly 130 is coupled to the receiver 110 by interlocking the one or more protrusions 202 on the receiver 110 with the one or more corresponding apertures 204 in the bracket 206. In view 480, the pedal assembly 130 is rotated within the receiver 110 to align the bracket mount plate aperture 210 with the chassis plate aperture 111*a*. In view 490, the pedal assembly 130 is coupled to the chassis plate 111 via the aligned bracket mount plate aperture 210 and chassis plate aperture 111*a*.

When coupling the pedal assembly 130 to the chassis plate 111 via the aligned bracket mount plate aperture 210 and chassis plate aperture 111*a*, as in views 450 and 490, a bolt 212 may be passed through the apertures 210 and 111*a* and threaded through a nut coupled to the chassis plate 111. By way of another example (not shown), a nut may be threaded onto one or more threaded rods coupled to the chassis plate 111 and passed through the apertures 210 and 111*a*. It is noted herein the bolt 212 and corresponding nut may instead be any fastener known in the art.

It is noted herein that the chain 412 and the rear wheel 107 including the rear sprocket 410 are removed from FIGS. 4J-4M and 4N-4Q solely for purposes of increasing visualization about how the pedal assembly 130 couples to the attachment receiver 110. It should be understood by those skilled in the art that the chain 412 remains coupled to the main sprocket 404 and the rear sprocket 410 while the pedal assembly 130 is coupled to the attachment receiver 110, such that it is not required to uncouple or break apart the chain 412 from the main sprocket 404, or remove the rear wheel, to install the pedal assembly 130 on the conversion bicycle 100. Therefore, the above description should not be interpreted as a limitation on the scope of the present disclosure but merely an illustration.

Although embodiments of the present disclosure are directed to the receiver 110 including the protrusions 202 and the bracket 206 of the pedal assembly 130 including the corresponding apertures 204, it is noted herein that any of the sets of protrusions and corresponding apertures illustrated in FIGS. 2C-2H (e.g. 222/224, 232/234, 242/244) may instead be incorporated into the receiver 110 and pedal assembly 130. Therefore, the above description should not be interpreted as a limitation on the scope of the present disclosure but merely an illustration.

Although embodiments of the present disclosure, and the illustrations of FIGS. 4A-4Q, are directed to the pedal assembly including the main sprocket 404, the rear sprocket 410, and the chain 412, it is noted herein that the main transmission component, the rear transmission component, and the power transmission component may be any component as previously described herein. For example, the transmission assembly may instead include a main toothed pulley 404, a rear toothed pulley 410, and a toothed belt 412. By way of another example, the transmission assembly may instead include a main smooth pulley 404, a rear smooth pulley 410, and an elastic band 412. Therefore, the above description should not be interpreted as a limitation on the scope of the present disclosure but merely an illustration.

In one embodiment, the bicycle 100 does not include a brake assembly. In another embodiment, the conversion bicycle 100 includes a brake assembly. For example, the brake assembly may include a coaster brake assembly. For instance, the coaster brake assembly may include internal friction shoes actuated by the crankset 401 and the chain 412. By way of another example, the brake assembly may include a pad brake assembly. By way of another example, the brake assembly may include a disc brake assembly. By way of another example, the brake assembly may include a direct-drive transmission assembly (e.g. the bicycle 100 is a fixed-gear transmission assembly, or is a "fixie"), such that actuating the pedal assembly 130 more slowly will rotate the rear wheel 107 more slowly. By way of another example, the brake assembly may instead include a number of additional and/or alternative brake assembly designs.

In another embodiment, the conversion bicycle 100 includes a rear brake assembly. For example, the rear brake assembly may prevent the rear wheel 107 from rotating when the pedal assembly 130 is actuated in a selected rotational direction. In another embodiment, the conversion bicycle 100 includes a front brake assembly. For example, the front brake assembly may prevent the front wheel 105 from rotating.

It is noted herein any chassis components necessary to couple to a rear brake assembly may be implemented to couple to a fender assembly.

Figure 5A:
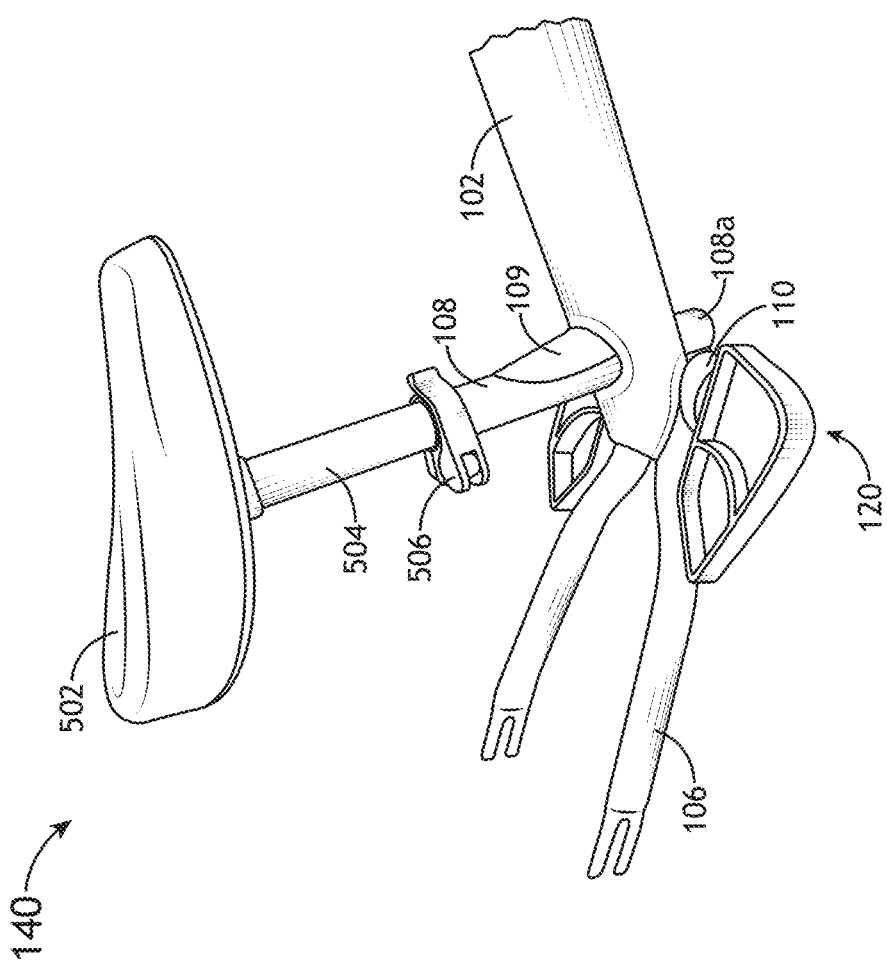
FIG. 5A illustrates a seat assembly, in accordance with one or more embodiments of the present disclosure.
Figure 5B:
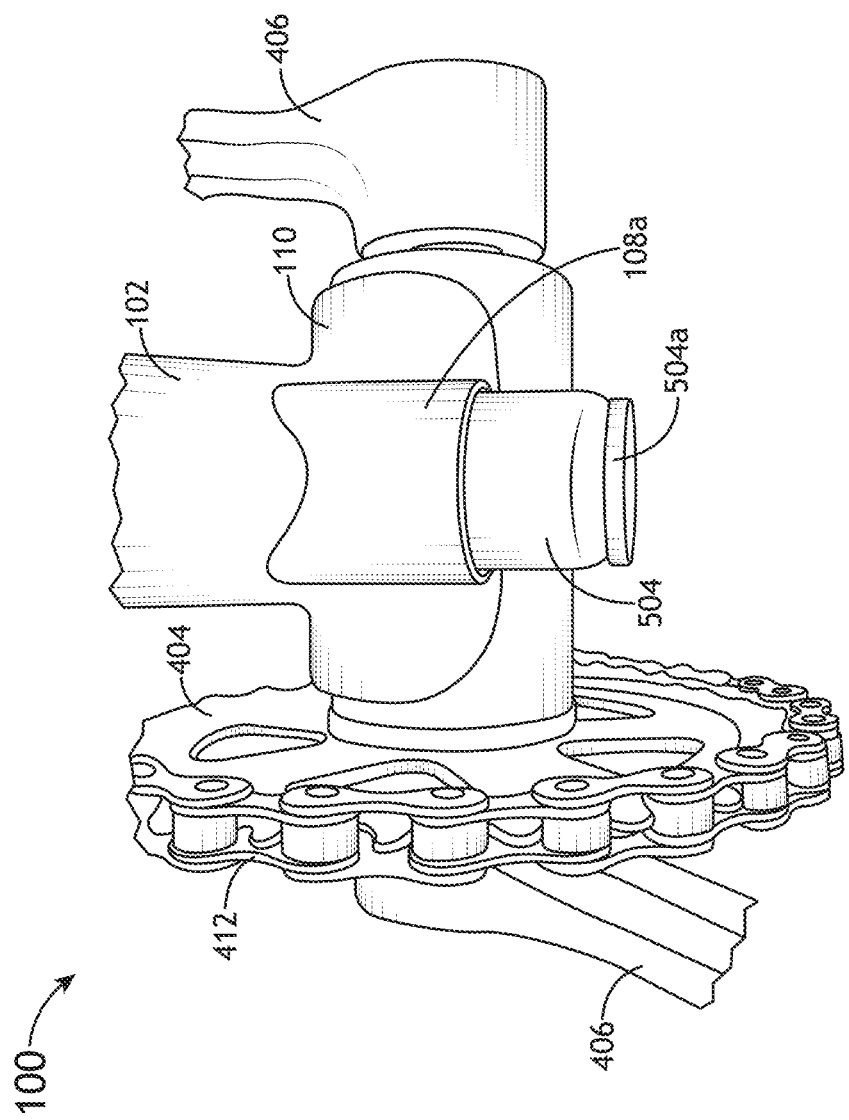
FIG. 5B illustrates a lower portion of a seat assembly, in accordance with one or more embodiments of the present disclosure.

FIGS. 5A and 5B illustrate the seat assembly 140, in accordance with one or more embodiments of the present disclosure.

In one embodiment, the seat assembly 140 includes a seat 502. In another embodiment, the seat 502 is coupled to the seat post 504. For example, the seat 502 may be coupled to the seat post 504 via a clamp. By way of another example, the seat 502 may be coupled to the seat post 504 via a fastener assembly. By way of another example, the seat 502 may be press-fit onto the seat post 504.

In another embodiment, a seat post clamp 506 is coupled to a notched portion of the seat tube 108. For example, the seat post clamp 506 is configured to secure the seat post 504 at a selected height by compressing the seat tube 108 against the seat post 504. In this regard, the seat 502 may be adjusted to fit users of different heights.

In another embodiment, the seat post 504 passes through the seat tube 108. In another embodiment, the seat post 504 exits the section 108*a* of the seat tube 108 in front of the attachment receiver 110. In another embodiment, the seat post 504 has a cap 504*a* to prevent injury from any potentially sharp edges of the seat post 504. In this regard, the seat 502 height includes a range that is only otherwise accomplished with a set of seat posts 504 (e.g. a shorter seat post and a longer seat post) that must be switched out as the user grows. For example, the seat 502 height may range from, but is not limited to, 10 inches to 33 inches. For instance, the seat 502 height may range from, but is not limited to, 15 inches to 22 inches.

It is noted herein, however, that the seat post 504 is not required to exit the section 108*a*. For example, the user may require a seat 502 height that would not allow for seat post 504 to exit the section 108*a*. By way of another example, the receiver 110 may be coupled to the main tube 102 underneath the seat tube 108, such that there is no section 108a for the seat post 504 to exit.

Figure 6:
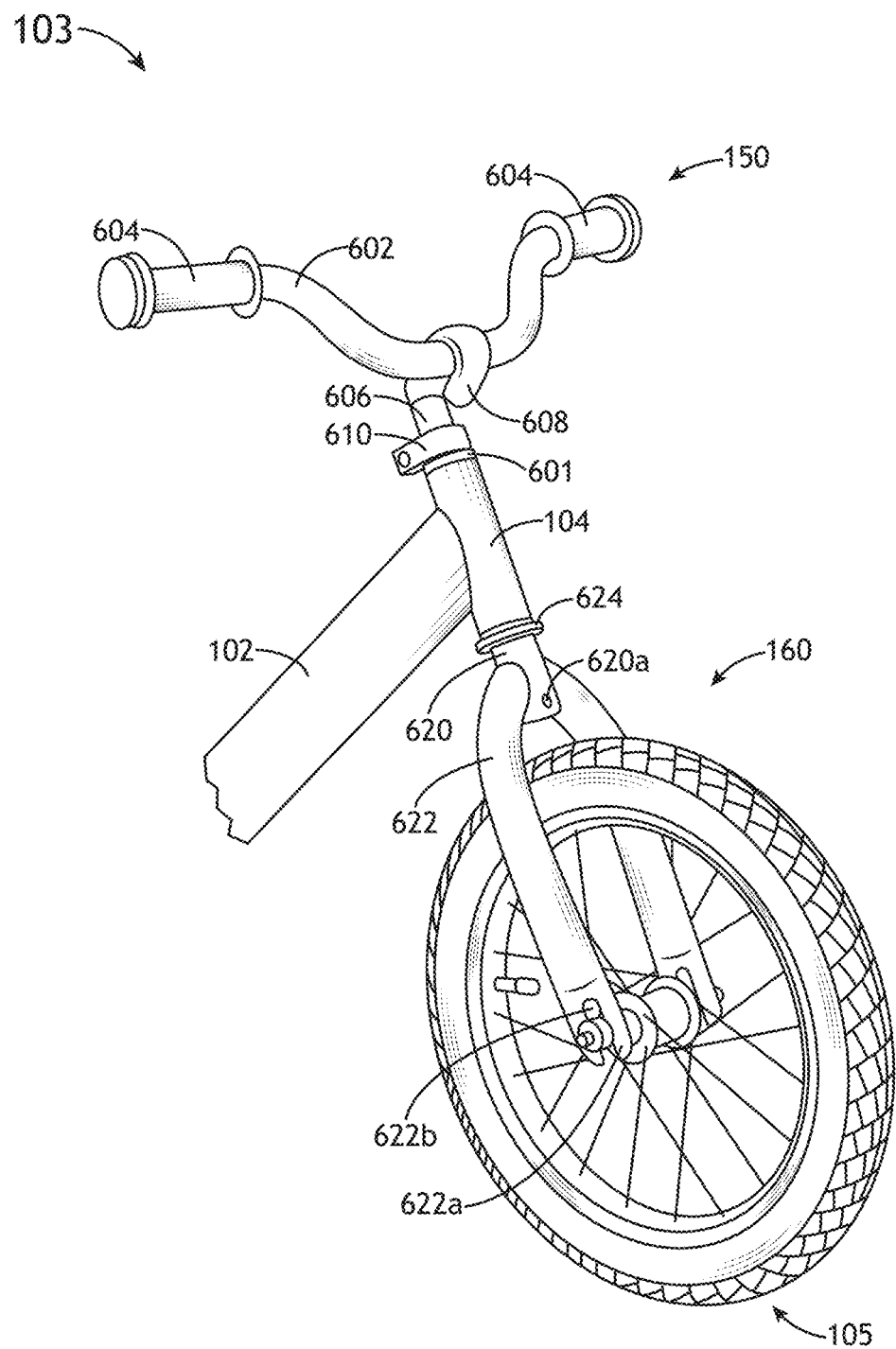
FIG. 6 illustrates a steering assembly, in accordance with one or more embodiments of the present disclosure.

FIG. 6 illustrates the steering assembly 103, in accordance with one or more embodiments of the present disclosure.

In one embodiment, the steering assembly 103 includes a headset 601. In another embodiment, the steering assembly 103 includes a front fork assembly 160 coupled to the headset 601. In another embodiment, the steering assembly 103 includes a handlebar assembly 150 coupled to the front fork assembly 160 within the headset 601.

In another embodiment, the headset 601 is a bushing press-fit into the head tube 104. For example, the bushing may be manufactured from any plastic, thermoplastic, resin, ceramic, metal, rubber, composite, or other material suitable for any manufacturing process known in the art. In another embodiment, the headset 601 includes one or more bearing assemblies press-fit into the head tube 104.

In another embodiment, one or more spacers may be coupled to an exposed portion of the headset 601 and one or more components of the handlebar assembly 150. In another embodiment, one or more spacers 624 may be coupled to an exposed portion of the headset 601 and one or more components of the front fork assembly 160. In this regard, the spacers 624 may prevent unnecessary wear of the exposed portions of the headset 601 (or the head tube 104, should no portion of the headset 601 be exposed), as well as the one or more components of the handlebar assembly 150 or the front fork assembly 160. In another embodiment, the spacers 624 may be manufactured from any plastic, thermoplastic, resin, ceramic, metal, rubber, composite, or other material suitable for any manufacturing process known in the art.

In one embodiment, the handlebar assembly 150 includes a handlebar 602. For example, the handlebar 602 may include one or more curved sections. By way of another example, the handlebar 602 may be straight. In another embodiment, the handlebar 602 includes one or more handlebar grips 604. In another embodiment (not shown), the handlebar 602 includes one or more safety pads.

In another embodiment, the handlebar 602 is coupled to a handlebar clamp 608. In another embodiment, the handlebar clamp 608 is configured to secure the handlebar at a selected angle from the vertical plane. In this regard, the handlebar 602 may be adjusted to fit users of different heights.

In another embodiment, the handlebar assembly includes a stem 606. In another embodiment, the handlebar clamp 608 and the stem 606 are a single component. In another embodiment (not shown), the handlebar clamp 608 and the stem 606 are separate components. For example, the handlebar clamp 608 may be coupled to a tube with a secondary clamp, where the secondary clamp couples to the stem 606.

In another embodiment, the stem 606 is coupled to the headset 601. In another embodiment, the stem 606 is coupled to the front fork tube 620 coupled to the headset 601, described in detail further herein. In another embodiment, a stem clamp 610 is coupled to a notched portion of the front fork tube 620 extending out of the headset 601. For example, the stem clamp 610 is configured to secure the stem 606 at a selected height by compressing the portion of the front fork tube 620 extending out of the headset 601 against the stem 606. In another embodiment (not shown), an expander core assembly is coupled to the stem. In another embodiment, the expander core assembly is configured to secure the stem 606 at a selected height. In this regard, the stem 606 (and subsequently the handlebar assembly 150) may be adjusted to fit users of different heights.

In one embodiment, the front fork assembly 160 includes a front fork tube 620. In another embodiment, the front fork tube 620 is coupled to the headset 601. In another embodiment, the front fork tube 620 includes a mount point 620a. For example, mount point 620a may couple to a front brake assembly. By way of another example, mount point 620a may couple to a fender assembly.

In another embodiment, the front fork assembly 160 includes a first front fork arm 622 and a second front fork arm 622 coupled to the front fork tube 620. In another embodiment, the front wheel 105 is coupled to the front fork assembly 160 via a dropout 622b of the first front fork arm 622 and the second front fork arm 622. For example, the first front fork arm 622 and the second front fork arm 622 may include the dropout 622b cut into a flattened portion 622a of the first front fork arm 622 and the second front fork arm 622. By way of another example, the dropout 622b may be formed by affixing one or more tabs 622a to the first front fork arm 622 and the second front fork arm 622.

In additional embodiments, the attachment assembly includes a motor assembly. In another embodiment, the motor assembly includes a motor. For example, the motor may be electric. By way of another example, the motor may be gas-powered. In another embodiment, where the motor assembly is electric, the motor assembly includes a battery pack with one or more batteries. For example, the electric motor assembly may include one or more motor assembly components coupled at least one of the battery pack and the electric motor, the motor assembly components including, but not limited to, a battery charge indicator, a power switch, a throttle controller, an emergency cut-off switch, and the like. In another embodiment, where the motor assembly is gas-powered, the motor assembly may include one or more of a gas tank, an oil reservoir, and/or an air filter. For example, the gas-powered motor assembly may include one or more motor assembly components coupled to at least one of the gas tank, the oil reservoir, and the gas-powered motor, the motor assembly components including, but not limited to, a gas gauge, an oil gauge, a power switch, a throttle controller, an emergency cut-off switch, and the like.

In another embodiment, the motor assembly includes a transmission assembly. For example, the transmission assembly may include any of the main transmission components, the rear transmission components, and/or the power transmission components as previously described herein. In another embodiment, the motor assembly includes a set of footpegs and/or footrests. For example, a user may rest their feet on the set of footpegs while operating the conversion bicycle 100. In another embodiment, the motor assembly includes any additional motor assembly component known in the art.

It is noted herein that one or more of the motor, the battery pack, the transmission assembly, the front pegs, or any additional motor assembly component may be coupled to the bracket assembly 201. It is further noted herein that one or more of the motor, the battery pack, the transmission, the front pegs, or any additional motor assembly component may be coupled to a component of the chassis 101 including, but not limited to, the main tube 102, the head tube 104, the rear fork 106, the seat tube 108, or the attachment receiver 110.

In additional embodiments, any component of the conversion bicycle 100 are scalable from a set of dimensions accommodating a child to a set of dimensions accommodating an adult. For example, the front wheel 105 and the rear wheel 107 may range from, but is not limited to, 10-32 inches in diameter. By way of another example, the front wheel 105 and the rear wheel 107 may range from, but is not limited to, any standard size ranging from 350-750 mm. By way of another example, any component of the bicycle 100 not previously described as having a set of dimensions accommodating an adult may be considered as being scalable to include a set of dimensions accommodating an adult.

In additional embodiments, the conversion bicycle 100 may come pre-packaged with both the footrest assembly 120 and the pedal assembly 130, where the footrest assembly 120 and the pedal assembly 130 are separately wrapped. As the footrest assembly 120 and the pedal assembly 130 are separately wrapped, it is possible to prevent access to the footrest assembly 120 and the pedal assembly 130 until the user is proficient enough with the previous step to need the more challenging components installed on the conversion bicycle 100.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:
1. A conversion bicycle apparatus comprising:
a chassis comprising:
  a main tube;
  a head tube;
  a seat tube;
  a rear fork including a first fork arm and a second fork arm; and
  an attachment receiver, wherein the attachment receiver is located proximate to a junction of at least the main tube and the rear fork,
wherein an attachment assembly is detachably couplable to the attachment receiver via one or more protrusions and one or more corresponding apertures,
wherein the attachment assembly is detachably couplable to the chassis via one or more fasteners, wherein the attachment assembly comprises:
a bracket assembly comprising a bracket and a bracket mount plate; and
at least one conversion component,
wherein the bracket is detachably couplable to the attachment receiver of the chassis via one or more protrusions and one or more corresponding apertures.
2. The conversion bicycle apparatus in claim 1, wherein the bracket mount plate is detachably couplable to a chassis mount plate on the chassis via one or more fasteners.
3. The conversion bicycle apparatus in claim 1, wherein the bracket includes one or more apertures corresponding to one or more protrusions on the attachment receiver.
4. The conversion bicycle apparatus in claim 1, wherein the attachment receiver includes one or more apertures corresponding to one or more protrusions on the bracket.
5. The conversion bicycle apparatus in claim 1, wherein the attachment assembly comprises a footrest assembly, wherein the at least one conversion component comprises one or more footrests.
6. The conversion bicycle apparatus in claim 5, wherein the one or more footrests are affixed to the bracket.
7. The conversion bicycle apparatus in claim 5, wherein the one or more footrests are contoured to at least one of the first fork arm or the second fork arm of the rear fork.
8. The conversion bicycle apparatus in claim 5, wherein the footrest assembly is detachably rotatable in the attachment receiver to align a bracket mount plate aperture of the bracket mount plate with a chassis plate aperture of the chassis plate.
9. The conversion bicycle apparatus in claim 8, wherein the footrest assembly is detachably couplable to the chassis plate with one or more fasteners via the aligned bracket mount plate aperture and chassis plate aperture.
10. The conversion bicycle apparatus in claim 1, wherein the attachment assembly comprises a pedal assembly, wherein the at least one conversion component includes a crankset.
11. The conversion bicycle apparatus in claim 10, wherein the crankset comprises:
at least one bearing assembly coupled to the bracket;
a shaft coupled to the at least one bearing assembly, wherein the shaft includes a first end and a second end;
a main transmission component coupled to the first end of the shaft;
a first pedal crank coupled to the first end of the shaft and a second pedal crank coupled to the second end of the shaft;
a first pedal coupled to the first pedal crank and a second pedal coupled to the second pedal crank; and
a power transmission component detachably couplable to the main transmission component,
wherein the power transmission component is detachably couplable to a rear transmission component on a rear wheel,
wherein the rear wheel is coupled to the rear fork.
12. The conversion bicycle apparatus in claim 11, wherein the main transmission component comprises:
a main sprocket, a main toothed pulley, or a main smooth pulley.
13. The conversion bicycle apparatus in claim 11, wherein the power transmission component comprises:
a chain, a toothed belt, a smooth belt, or an elastic band.
14. The conversion bicycle apparatus in claim 13, further comprising a guard, wherein the guard is detachably couplable to the attachment receiver, wherein the guard covers at least a portion of at least one of the chain, the toothed belt, the smooth belt, or the elastic band, wherein the guard comprises:
a forward ring; and
a rear cover detachably couplable to the forward ring.
15. The conversion bicycle apparatus in claim 11, wherein the rear transmission component comprises:
a rear sprocket, a rear toothed pulley, or a rear smooth pulley.
16. The conversion bicycle apparatus in claim 11, wherein the pedal assembly is detachably couplable to the rear transmission component on the rear wheel via the power transmission component from the main transmission component without at least one of uncoupling the power transmission component, breaking apart the power transmission component, or removing the rear wheel.
17. The conversion bicycle apparatus in claim 16, wherein the pedal assembly is detachably rotatable in the attachment receiver to align a bracket mount plate aperture of the bracket mount plate with a chassis plate aperture of the chassis plate.
18. The conversion bicycle apparatus in claim 17, wherein the pedal assembly is detachably couplable to the chassis plate via the aligned bracket mount plate aperture and chassis plate aperture.
19. The conversion bicycle apparatus in claim 1, further comprising a brake assembly, wherein the brake assembly is coupled to the chassis, wherein the brake assembly includes at least one of:
a coaster brake assembly, a pad brake assembly, a disc brake assembly, or a fixed-gear assembly.
20. The conversion bicycle apparatus in claim 1, further comprising:
a seat assembly comprising:
a seat post coupled to the seat tube;
a seat coupled to the seat post; and
a seat post clamp configured to secure the seat post at a selected height,
wherein the seat post is configured to pass through the seat tube, wherein the seat post is further configured to exit through a lower opening of the seat tube.
21. The conversion bicycle apparatus in claim 1, wherein the chassis is propellable via user contact with the ground while a user straddles the chassis.

22. The conversion bicycle apparatus in claim 1, wherein the chassis is propellable via user contact with the ground while a user sits on a seat of a seat assembly coupled to the seat tube.

23. The conversion bicycle apparatus in claim 1, wherein the rear fork is configured to support the feet of a user when the user is at least one of coasting or gliding.

24. The conversion bicycle apparatus in claim 1, wherein the attachment assembly is configured to support the feet of a user when the user is at least one of coasting or gliding, wherein the chassis is propellable via actuation of the attachment assembly.

25. The conversion bicycle apparatus in claim 24, wherein the attachment assembly comprises at least one of the footrest assembly or the pedal assembly.

26. An apparatus comprising:
an attachment receiver of a chassis of a vehicle, wherein the attachment receiver is located proximate to a junction of at least two additional components of the chassis,
wherein an attachment assembly is detachably couplable to the attachment receiver via one or more protrusions and one or more corresponding apertures,
wherein the attachment assembly is detachably couplable to the chassis via one or more fasteners,
a bracket assembly comprising a bracket and a bracket mount plate; and at least one conversion component,
wherein the bracket is detachably couplable to the attachment receiver of the chassis via one or more protrusions and one or more corresponding apertures.

27. The apparatus in claim 26,
wherein the bracket mount plate is detachably couplable to a chassis mount plate on the chassis via one or more fasteners.

28. A method comprising:
coupling an attachment assembly to an attachment receiver of a chassis of a vehicle via one or more protrusions and one or more corresponding apertures;
rotating the attachment assembly in the attachment receiver to align a bracket mount plate aperture of a bracket mount plate of the attachment assembly with a chassis plate aperture of a chassis plate; and
coupling the attachment assembly to the chassis plate via the aligned bracket mount plate aperture and chassis plate aperture with one or more fasteners.

29. The method of claim 28, further comprising:
coupling the attachment assembly to a rear transmission component on a rear wheel of the vehicle via a power transmission component without uncoupling the power transmission component from a main transmission component on the attachment assembly, prior to detachably coupling the attachment assembly to the attachment receiver of the chassis of the vehicle via the one or more protrusions and the one or more corresponding apertures.

30. An adaptable bicycle operable by a user via a set of configurations, the set of configurations comprising:
a first configuration, wherein the user straddles a chassis of the adaptable bicycle, wherein the user propels the chassis via contact with the ground;
a second configuration, wherein the user sits on a seat of a seat assembly of the adaptable bicycle, wherein the user propels the chassis via contact with the ground;
a third configuration, wherein the user sits on the seat of the adaptable bicycle, wherein the user alternates between propelling the chassis via contact with the ground and resting their feet on a rear fork of the chassis while at least one of coasting or gliding;
a fourth configuration, wherein the user alternates between sitting on the seat of the adaptable bicycle and propelling the chassis via contact with the ground, and standing on the rear fork of the adaptable bicycle and propelling the chassis forward by shifting their weight to maintain a momentum generated by propelling the chassis via contact with the ground;
a fifth configuration, wherein the user sits on the seat of the adaptable bicycle, wherein the user alternates between propelling the chassis via contact with the ground and resting their feet on an attachment assembly detachably couplable to an attachment receiver of the chassis while at least one of coasting or gliding, wherein the attachment assembly comprises: a bracket assembly comprising a bracket and a bracket mount plate; and at least one conversion component, wherein the bracket is detachably couplable to the attachment receiver of the chassis via one or more protrusions and one or more corresponding apertures; and
a sixth configuration, wherein the user sits on the seat of the adaptable bicycle, wherein the user alternates between propelling the chassis via contact with the ground and propelling the chassis via actuation of the attachment assembly.

31. The adaptable bicycle in claim 30, wherein the attachment assembly comprises at least one of a footrest assembly or a pedal assembly.

* * * * *